(12) United States Patent
Cross et al.

(10) Patent No.: US 12,413,319 B2
(45) Date of Patent: Sep. 9, 2025

(54) TESTING A SIGNAL PATH

(71) Applicant: Northrop Grumman Systems Corporation, Falls Church, VA (US)

(72) Inventors: David I. Cross, Jessup, MD (US); Jonathan D. Egan, Hanover, MD (US); Robert J. March, Bel Air, MD (US); Ty L. Barkdoll, Columbia, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 397 days.

(21) Appl. No.: 17/819,578

(22) Filed: Aug. 12, 2022

(65) Prior Publication Data

US 2024/0056202 A1 Feb. 15, 2024

(51) Int. Cl.
*H04B 17/309* (2015.01)
*G01S 7/40* (2006.01)
*H01Q 3/26* (2006.01)
*H01Q 3/28* (2006.01)
*H01Q 3/36* (2006.01)

(52) U.S. Cl.
CPC .................................. *H04B 17/309* (2015.01)

(58) Field of Classification Search
None
See application file for complete search history.

(56) References Cited

U.S. PATENT DOCUMENTS

| | | | | |
|---|---|---|---|---|
| 5,559,519 A | * | 9/1996 | Fenner | G01S 7/032 342/174 |
| 6,236,363 B1 | * | 5/2001 | Robbins | H01Q 3/267 342/372 |
| 6,259,314 B1 | | 7/2001 | Liu et al. | |
| 6,480,153 B1 | * | 11/2002 | Jung | H01Q 3/267 342/368 |
| 6,809,685 B2 | * | 10/2004 | Hancock | H01Q 3/267 342/368 |
| 7,181,168 B2 | | 2/2007 | Grant et al. | |
| 7,304,605 B2 | * | 12/2007 | Wells | G01S 19/23 342/357.62 |
| 7,671,799 B1 | * | 3/2010 | Paek | H01Q 15/0053 359/344 |
| 8,085,189 B2 | * | 12/2011 | Scott | H01Q 3/267 343/700 R |

(Continued)

FOREIGN PATENT DOCUMENTS

| CN | 102540052 B | 7/2015 |
|---|---|---|
| WO | 2014164229 A1 | 10/2014 |

*Primary Examiner* — Tuan A Tran
(74) *Attorney, Agent, or Firm* — TraskBritt

(57) ABSTRACT

Embodiments of the present disclosure relate generally to testing one or more signal paths. For example, a signal path may include a phase shifter that may impart a phase shift to signals passing through the signal path. Some embodiments may test a phase shift imparted to a signal by the signal path, including the phase shifter. Some embodiments may test the phase shift by comparing the phase of a signal at an input of the signal path with the phase of a signal at the output of the signal path. Some embodiments may test the phase shift by providing a signal at inputs of two phase paths and comparing the phases of signals at the outputs of the signal paths. Some embodiments may further adjust a phase shifter responsive to the test. Related devices, systems and methods are also disclosed.

17 Claims, 11 Drawing Sheets

(56) References Cited

U.S. PATENT DOCUMENTS

| | | | |
|---|---|---|---|
| 8,184,042 B2 * | 5/2012 | Ray | H01Q 3/267 342/174 |
| 8,212,716 B2 * | 7/2012 | Goshen | G01S 7/4004 342/165 |
| 8,264,406 B2 * | 9/2012 | Thomas | H04B 7/0617 342/422 |
| 8,686,736 B2 | 4/2014 | Forstner | |
| 8,730,097 B1 * | 5/2014 | Uscinowicz | H01Q 3/267 342/174 |
| 8,957,808 B2 * | 2/2015 | Ookawa | G01S 7/40 342/174 |
| 9,113,346 B2 * | 8/2015 | Pivit | H01Q 3/267 |
| 9,203,151 B2 * | 12/2015 | Jacobs | H01Q 5/00 |
| 9,653,820 B1 * | 5/2017 | West | H01Q 21/0025 |
| 9,705,611 B1 * | 7/2017 | West | H01Q 3/267 |
| 9,791,552 B1 * | 10/2017 | Schuman | H01Q 3/267 |
| 9,979,084 B2 * | 5/2018 | Sikina | H01Q 1/288 |
| 10,103,431 B2 * | 10/2018 | Swirhun | H01Q 3/36 |
| 10,476,168 B2 * | 11/2019 | Pruett | H01Q 21/061 |
| 10,663,563 B2 * | 5/2020 | Schuman | G01S 7/4026 |
| 11,158,940 B2 * | 10/2021 | Rafique | H01Q 3/267 |
| 11,552,717 B2 * | 1/2023 | Kinghorn | H04B 17/12 |
| 11,621,737 B2 * | 4/2023 | Davies | H04B 1/1036 375/349 |
| 11,664,878 B1 * | 5/2023 | Bruzzone | H04B 7/0865 375/349 |
| 11,784,727 B2 * | 10/2023 | Zhou | H01Q 1/2283 370/252 |
| 11,942,694 B2 * | 3/2024 | Rafique | H04B 17/19 |
| 2011/0254736 A1 * | 10/2011 | Thomas | H04B 17/10 342/417 |
| 2014/0256376 A1 | 9/2014 | Weissman et al. | |
| 2021/0359770 A1 * | 11/2021 | Kinghorn | H04B 17/21 |
| 2022/0385321 A1 * | 12/2022 | Davies | H04B 1/1036 |

* cited by examiner

TESTING A SIGNAL PATH

FIELD

This description relates, generally, to testing a signal path. More specifically, some examples relate to methods of testing signal paths, devices including one or more signal paths, the devices being capable of testing the one or more signal paths, and/or systems including one or more signal paths, the systems capable of testing the one or more signal paths.

BACKGROUND

A phased-array radar may include an exciter that may generate an oscillating signal e.g., a signal oscillating at radio frequency e.g., between extremely low frequencies (e.g., 3 hertz (Hz)) and tremendously high frequencies (e.g., frequencies in the terahertz (THz) range). The phased-array radar may include a number of antenna elements that may be excited by the oscillating signal to transmit a signal. The phased-array radar may include a respective signal path between each of the number of antenna elements and the exciter. Each of the signal paths may provide the oscillating signal to an antenna element to which the signal path is coupled. Each of the respective signal paths may be capable of independently shifting the phase of the oscillating signal between the exciter and the respective antenna element to steer a beam of the transmitted signal.

The phased-array radar may also receive a signal at antenna elements of the phased-array radar (e.g., a reflection of the transmitted signal). Each of the signal paths may provide the signal, as received at the antenna element to which the signal path is coupled, to an array receiver. Each of the respective signal paths may be capable of independently shifting a phase of the received signal to steer a receiving beam.

SUMMARY

Various embodiments may include a device including signal paths comprising respective front ends for coupling to respective antenna elements and respective back ends for coupling to a manifold. The device may also include a comparator. The comparator may be coupled to a respective front end of a first signal path of the signal paths and coupled to a respective back end of the first signal path, to compare a phase of a first signal from the respective front end of the first signal path with a phase of a second signal from the respective back end of the first signal path. Additionally or alternatively, the comparator may be coupled to the respective front end of the first signal path and coupled to a respective front end of a second signal path of the signal paths, to compare the phase of the first signal from the respective front end of the first signal path with a phase of a third signal from the respective front end of the second signal path. Additionally or alternatively, the comparator may be coupled to the respective back end of the first signal path and coupled to a respective back end of the second signal path, to compare the phase of the second signal from the respective back end of the first signal path with a phase of a fourth signal from the respective back end of the second signal path.

Various embodiments may include a device including a signal path comprising a front end for coupling to an antenna and a back end for coupling to a manifold. The device may also include a comparator coupled to the front end and coupled to the back end. The comparator may compare a phase of a first signal from the front end with a phase of a second signal from the back end.

Various embodiments may include a device including a first signal path comprising a first front end for coupling to a first antenna and a first back end for coupling to a manifold. The device may also include a second signal path comprising a second front end for coupling to a second antenna and a second back end for coupling to the manifold. The device may also include a comparator coupled to the first front end and coupled to the second front end. The comparator may compare a first signal from the first front end with a second signal from the second front end.

Various embodiments may include a first signal path comprising a first front end for coupling to a first antenna and a first back end for coupling to a manifold. The device may also include a second signal path comprising a second front end for coupling to a second antenna and a second back end for coupling to the manifold. The device may also include a comparator coupled to the back front end and coupled to the second back end. The comparator may compare a first signal from the first back end with a second signal from the second back end.

Various embodiments may include a method. The method may include providing a test signal to an input of a signal path. The method may also include modulating a phase shifter of the signal path. The method may also include comparing a phase of a first signal with a phase of a second signal. The method may also include adjusting the phase shifter responsive to the comparison.

Various embodiments may include a method. The method may include providing a test signal to an input of a signal path. The method may also include modulating a phase shifter of the signal path. The method may also include comparing a phase of the test signal to a phase of an output signal at an output of the signal path. The method may also include adjusting the phase shifter responsive to the comparison.

Various embodiments may include a method. The method may include providing a test signal to an input of a first signal path. The method may also include providing the test signal to an input of a second signal path. The method may also include modulating a first phase shifter of the first signal path. The method may also include comparing a phase of a first output signal at an output of the first signal path with a phase of a second output signal at an output of the second signal path. The method may also include adjusting one or both of the first phase shifter and a second phase shifter of the second signal path responsive to the comparison.

Various embodiments may include a method. The method may include providing a test signal at respective inputs of signal paths. The method may also include activating the signal paths. The method may also include obtaining, at respective comparators at the respective signal paths, phase and amplitude measurements at respective outputs of the signal paths. The method may also include adjusting one or more of the signal paths responsive to the phase and amplitude measurements of the respective signal paths.

BRIEF DESCRIPTION THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Figure 1:
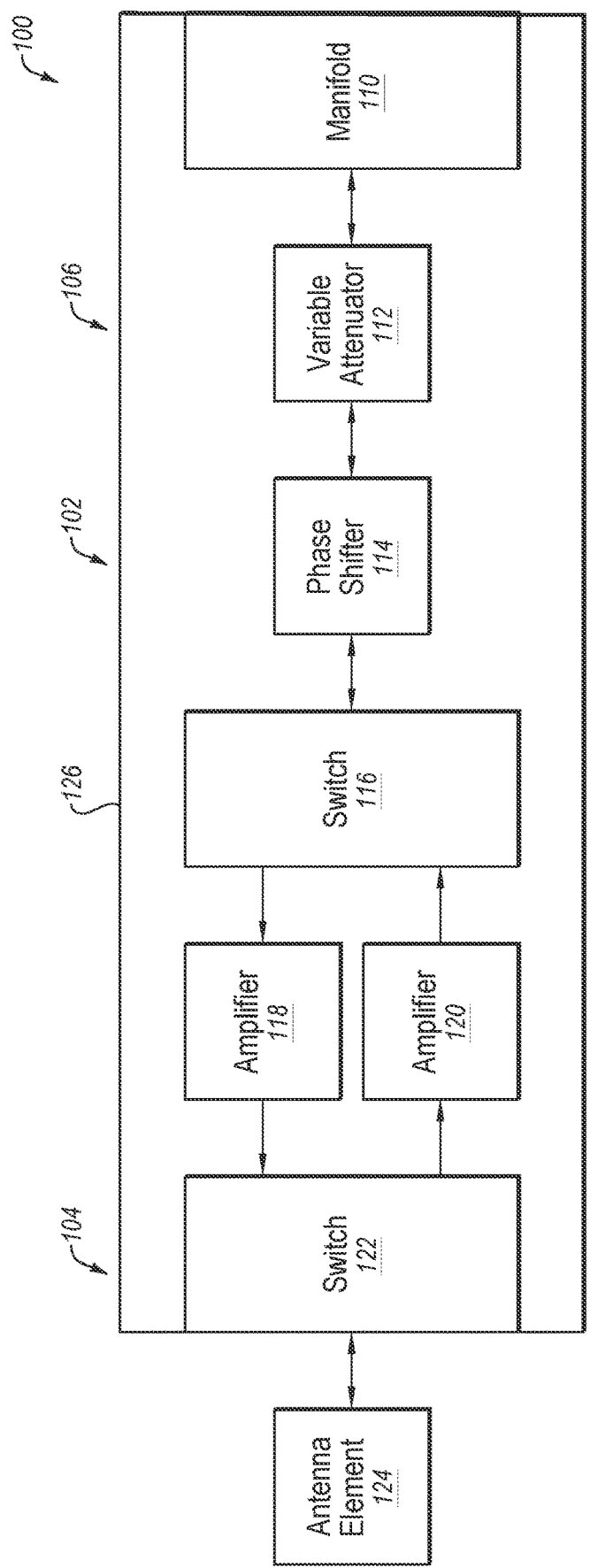
FIG. 1 is a functional block diagram illustrating an example device including a signal path.

Embodiments of the present disclosure relate generally to testing one or more signal paths. For example, a signal path may include a phase shifter. Some embodiments may test a phase shift imparted to a signal by the signal path, including the phase shifter. Some embodiments may further adjust the phase shifter responsive to the test.

As an example, some embodiments may include a comparator coupled to an input of a signal path (e.g., an input terminal of the signal path) and to an output of the signal path (e.g., to an output terminal of the signal path). The comparator may compare a phase of a signal (e.g., a test signal) at the input of the signal path with a phase of the signal at the output of the signal path. A phase shifter of the signal path may be adjusted such that the signal path cause a specific phase shift (e.g., according to a specification) to signals propagating through the signal path.

As another example, some embodiments may include a comparator coupled to an output of a first signal path (e.g., to an output terminal of the first signal path) and an output of a second signal path (e.g., to an output terminal of the second signal path). A test signal may be provided to respective inputs of the first signal path and the second signal path. The comparator may compare a phase of a signal (e.g., a test signal) as received at the output of the first signal path with the signal as received at the output of the second signal path. A phase shifter of the one or both of the signal paths may be adjusted such that the signal paths cause the same phase shift to signals propagating through the respective signal paths.

As another example, some embodiments may include a number of antenna elements, each of the antenna elements coupled to a respective signal path, each of the signal paths coupled to a respective comparator. All of the signal paths may receive a signal, e.g., a test signal. The signal paths may be tested one at a time by activating the signal paths, one at a time, and measuring an amplitude and/or phase of the signal as received at the output of the active signal path. After testing one or more of the signal paths, one or more of the tested signal paths may be adjusted, e.g., to cause the signal paths to impart uniform phase shift and/or uniform attenuation to signals propagating through the signal paths.

In the present disclosure, the term "signal path" may refer to a path for an electrical signal, e.g., an oscillating signal, e.g., oscillating at radio frequency, between one point and another point. A signal path may include any number of elements, e.g., lines, switches, couplers, amplifiers, and phase shifters.

In the present disclosure, the term "phase shift" may refer to a change in phase of an oscillating signal imparted by a signal path or by a phase shifter of a signal path. For example, a signal path may inherently cause a phase shift to a signal propagating through the signal path, e.g., based on a path length of the signal path. A phase shifter of the signal path may further shift the phase of the signal.

In the present disclosure, the term "attenuation," and like terms, may refer to a change (e.g., causing a decrease) in an amplitude of a signal. In the present disclosure, the term "gain," and like terms, may refer to a change (e.g., causing an increase) in an amplitude of a signal. References to gain and attenuation may be interchangeable.

In the present disclosure, examples are given including switches; the switches may be capable of coupling one line (e.g., an input) to one of two or more other lines (e.g., outputs). Alternative examples may include couplers in place of the switches; the couplers may be capable of redirecting a fraction of energy from one line to one or more other lines.

In the present disclosure, the term "coupled" and derivatives thereof may be used to indicate that two elements co-operate or interact with each other. When an element is described as being "coupled" to or with another element, then the elements may be in direct physical or electrical contact or there may be one or more intervening elements or layers present. In contrast, when an element is described as being "directly coupled" to or with another element, then there are no intervening elements or layers present. It will be understood that when an element is referred to as "coupling" a first element and a second element then it is coupled to the first element and it is coupled to the second element.

In the present disclosure, phased-array radars are given as examples of systems including signal paths. This disclosure is not limited to phased-array radars. Other examples systems that nay include systems for any phased array antenna, including, e.g., communications antennas (e.g., cellular base stations, satellite communications), radio astronomy, radio-frequency altimeters, signals intelligence collection antennas, electronic warfare antennas, radio frequency identification systems, and medical radio frequency ablation antennas.

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure, but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are only examples and should not be construed as the only way to implement the present disclosure unless specified otherwise herein. Additionally, block definitions and partitioning of logic between various blocks is an example of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the examples disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer executes computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

FIG. 1 is a functional block diagram illustrating an example device 100 including a signal path 102. Signal path 102 may be an example of a signal path that may be used in one or more embodiments of the present disclosure.

Signal path 102 includes a front end 104 coupled to an antenna element 124 and a back end 106 coupled to a manifold 110. Signal path 102 may alternately provide a signal to be transmitted from manifold 110 to antenna element 124 and a signal received at antenna element 124 to manifold 110.

Front end 104 may be, or may include, any point of signal path 102 to the left (from the perspective of FIG. 1) of phase shifter 114. Back end 106 may be, or may include, any point of signal path 102 to the right (from the perspective of FIG. 1) of phase shifter 114.

Manifold 110 may allow one or more signal paths (e.g., one or more instances of the signal path 102) to be coupled thereto. For example, multiple signal paths (e.g., including signal path 102) may be arranged adjacent to one another. Manifold 110 may be coupled to the multiple signal paths. Further, manifold 110 may allow for coupling signal path 102 (and/or other signal paths) to a larger system including e.g., an exciter and/or array receiver.

Signal path 102 includes a variable attenuator 112. Variable attenuator 112 may adjust an amplitude of a signal propagating through signal path 102. Variable attenuator 112 may be controlled by a controller (not illustrated in FIG. 1) to variably adjust the amplitude of the signal propagating through signal path 102. Variable attenuator 112 may be, or may include, a variable resistor.

Signal path 102 includes a phase shifter 114. Phase shifter 114 may adjust the phase of a signal propagating through signal path 102. Phase shifter 114 may be, or may include, one or more selectable delay elements or delay paths. Phase shifter 114 may be controlled by a controller (not illustrated in FIG. 1) to variably adjust the phase of the signal propagating through signal path 102.

Signal path 102 includes switch 116 and switch 122. Switch 116 and switch 122 may be controlled to operate together to cause a signal from manifold 110 to propagate through amplifier 118 and a signal from antenna element 124 to propagate through amplifier 120. Amplifier 118 may be a high-power amplifier to amplify a signal from manifold 110 to be transmitted at antenna element 124. Amplifier 120 may be a low-noise amplifier to amplify a signal received at antenna element 124.

Antenna element 124 may be an antenna or a radiator to be excited by an oscillating signal (to transmit) or by an electromagnetic field (to receive). Exciting antenna element 124 with an oscillating signal (e.g., provided by signal path 102) may generate a transmitted signal transmitted at antenna element 124 as an electromagnetic field. Also, an electromagnetic field impinging on antenna element 124 may excite antenna element 124. Antenna element 124, so excited, may generate a received signal that may propagate through signal path 102.

In some cases, signal path 102 (including variable attenuator 112, phase shifter 114, switch 116, amplifier 118, amplifier 120, and switch 122), may be included on a radio-frequency integrated circuit 126 (RFIC 126). In some embodiments, manifold 110 may, or may not, be considered part of signal path 102 (though in FIG. 1, manifold 110 is illustrated as included in signal path 102). In some embodiments, manifold 110 may or may not be included on RFIC 126 (though in FIG. 1, manifold 110 is illustrated as included in RFIC 126).

Figure 2:
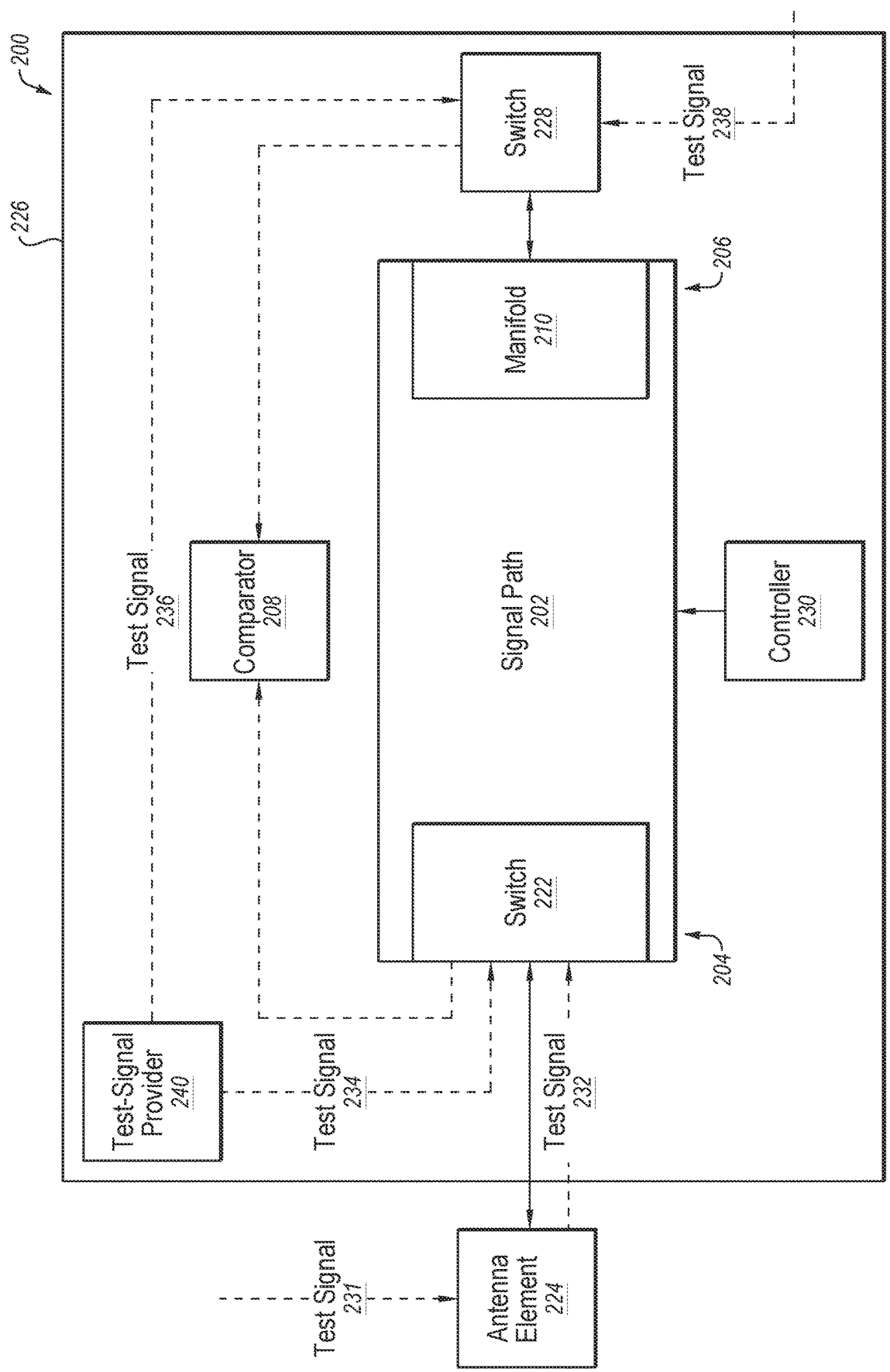
FIG. 2 is a functional block diagram illustrating an example device including a signal path according to one or more embodiments.

FIG. 2 is a functional block diagram illustrating an example device 200 including a signal path 202 according to one or more embodiments. Signal path 102 of FIG. 1 may be an example of signal path 202 of FIG. 2. Device 200 may compare a signal from a front end 204 of signal path 202 (e.g., illustrated by the dashed line between switch 222 and comparator 208) with a signal from a back end 206 of signal path 202 (e.g., illustrated by the dashed line between switch 228 and comparator 208). Device 200 may, responsive to the comparison, determine a status of signal path 202 and/or adjust signal path 202.

In the present disclosure, elements of some drawings (e.g., FIG. 1 through FIG. 6) may be the same as, be substantially similar to, and/or function substantially the same as, elements of other drawings. Further, a reference number having the same last two digits as a corresponding reference number in another drawing, may indicate that elements referenced by the respective reference numbers are substantially the same, absent explicit description to the contrary. For example, manifold 210 of FIG. 2 may be the same as, or substantially similar to manifold 110 of FIG. 1.

In the present disclosure, dashed lines may be used to illustrate signals, e.g., test signals and/or signals to be compared e.g., at a comparator. Such signals may traverse signal paths e.g., signaling lines. Thus, the dashed lines may also represent signal paths. Additionally, solid lines between elements may also illustrate signals and/or signal paths. Some of the solid lines between elements may illustrate signal paths that may be used during operation of the various devices and systems described herein. For example, the solid line between antenna element 224 and switch 222 may illustrate a signal path used during operation of device 200. In contrast, some of the dashed lines may illustrate signal paths that may be used during testing of the various devices and systems described herein. For example, the dashed line between switch 222 and comparator 208 and the dashed line between switch 228 and comparator 208 may be used during testing. However, some of the solid lines and some of the dashed lines may represent signal paths used during both operation and testing. For example, test signal 232 may traverse the solid line between antenna element 224 and switch 222.

Device 200 includes signal path 202. Signal path 202 includes front end 204 for coupling to antenna element 224 and back end 206 for coupling to manifold 210. Device 200 includes a comparator 208 coupled to front end 204 and coupled to back end 206. Comparator 208 may compare a phase (and/or amplitude) of a first signal from front end 204 with a phase (and/or amplitude) of a second signal from back end 206.

Comparator 208 may be coupled at any point of front end 204 of signal path 202. For example, comparator 208 may be coupled anywhere to the left (from the perspective of FIG. 2) of a phase shifter of signal path 202 (e.g., phase shifter 114 of FIG. 1, phase shifter not shown in FIG. 2). Comparator 208 may be coupled at any point of back end 206 of signal path 202 and/or to switch 228. For example, comparator 208 may be coupled anywhere to the right (from the perspective of FIG. 2) of a phase shifter of signal path 202, (e.g., phase shifter 114 of FIG. 1, phase shifter not shown in FIG. 2). Additionally or alternatively, comparator 208 may be coupled to switch 228 or to another manifold or switch to the right (from the perspective of FIG. 2) of signal path 202.

Device 200 may also include a switch 228. Switch 228 may variously couple manifold 210 to other elements e.g., to other manifolds and/or to elements of a larger system e.g., an array receiver and/or array exciter.

Device 200 may also include a controller 230. Controller 230 may control operation of a phase shifter (e.g., phase shifter 114 of FIG. 1, not illustrated in FIG. 2) of signal path 202. Controller 230 may also adjust the phase shifter. Controller 230 may also be capable of adjusting a variable attenuator (e.g., variable attenuator 112 of FIG. 1) of signal path 202. Further, controller 230 may also activate or deactivate signal path 202.

Device 200 may also include a test-signal provider 240. Test-signal provider 240 may provide one or more test signals (e.g., test signal 234 and/or test signal 236) to one or more locations of device 200.

As an example of contemplated operations of device 200, antenna element 224 may receive a test signal 231. Test signal 231 may be a signal propagating as an electromagnetic field. Antenna element 224 may be excited responsive to the test signal 231. Test signal 231 may have been transmitted by another antenna, e.g., in an antenna range to test a system, e.g., a system including signal path 202.

Continuing the example of contemplated operations, antenna element 224 may provide test signal 232, which test signal 232 may be test signal 231 as received at antenna element 224, to signal path 202 at front end 204, e.g., at switch 222. Test signal 232 may propagate through signal path 202 from front end 204 to back end 206, e.g., to manifold 210. Manifold 210 may provide a signal, e.g., test signal 232 as test signal 232 was received at manifold 210, to switch 228. Switch 228 may provide a signal, e.g., test signal 232 as test signal 232 was received at switch 228 to comparator 208. Alternatively, although not shown in FIG. 2, comparator 208 may be coupled to manifold 210 directly (e.g., rather than through the switch 228 as illustrated in FIG.

2) and may receive a signal, e.g., test signal 232 as test signal 232 was received at manifold 210.

As another example of contemplated operations of device 200, test-signal provider 240 may provide a test signal 234 to signal path 202, e.g., at switch 222. Test signal 234 may replicate a signal that would be received at antenna element 224. Test signal 234 may propagate through signal path 202 from front end 204 to back end 206, e.g., to manifold 210. Manifold 210 may provide a signal, e.g., test signal 234, as test signal 234 was received at manifold 210, to switch 228. Switch 228 may provide a signal, e.g., test signal 234, as test signal 234 was received at switch 228 to comparator 208. Alternatively, comparator 208 may be coupled to manifold 210 directly (e.g., rather than through the switch 228 as illustrated in FIG. 2) and may receive a signal, e.g., test signal 234 as test signal 234 was received at manifold 210.

As another example of contemplated operations of device 200, test-signal provider 240 may provide a test signal 236 to signal path 202 e.g., at switch 228 (or manifold 210). Test signal 236 may be a signal suitable for transmission at antenna element 224. Test signal 236 may propagate through signal path 202 from back end 206 to front end 204, e.g., to switch 222. Switch 222 may provide a signal, e.g., test signal 236, as test signal 236 was received at switch 222, to comparator 208.

As another example of contemplated operations of device 200, switch 228 (or manifold 210) may receive test signal 238. Test signal 238 may be a signal suitable for transmission at antenna element 224. Test signal 238 may be provided to switch 228 from another manifold and/or another element of an antenna system. For example, test signal 238 may be generated by an array exciter. Test signal 238 may propagate through signal path 202 from back end 206 to front end 204, e.g., to switch 222. Switch 222 may provide a signal, e.g., test signal 236, as test signal 236 was received at switch 222, to comparator 208.

According to any of the contemplated examples of operations above, or another example, comparator 208 may be coupled to front end 204 and to back end 206. Comparator 208 may compare the phase and/or amplitude of a signal from front end 204 with the phase and/or amplitude of a signal from back end 206. Comparator 208 and/or controller 230 may have information regarding a nominal phase shift and/or nominal attenuation of signal path 202, e.g., according to a specification of signal path 202. Additionally or alternatively, comparator 208 and/or controller 230 may have information regarding a threshold for phase shift and/or a threshold for attenuation of signal path 202.

In some embodiments, responsive to the comparison of the signal at front end 204 to the signal at back end 206, comparator 208 and/or controller 230 may determine a status (e.g., an operability status) of signal path 202. For example, based on a determination that a phase shift imparted to the test signal by signal path 202 and/or an attenuation imparted to the test signal by signal path 202 are not within respective thresholds (e.g., thresholds of the specification of signal path 202), comparator 208 and/or controller 230 may determine that signal path 202 is inoperative. In some embodiments, responsive to a determination that signal path 202 is inoperative, device 200 may determine not to use signal path 202, additionally or alternatively, controller 230 may disable signal path 202.

Additionally or alternatively, comparator 208 and/or controller 230 may adjust a phase shift and/or an attenuation imparted to signals by signal path 202 to cause the phase shift and/or attenuation to be within the threshold and/or to be closer to the nominal phase shift and or the nominal attenuation. For example, controller 230 may control a phase shifter (e.g., phase shifter 114 of FIG. 1, phase shifter not shown in FIG. 2) to adjust a phase shift of signal path 202 to cause the phase shift of signal path 202 to be substantially similar to the nominal phase shift of signal path 202. Additionally or alternatively, controller 230 may control a variable attenuator (e.g., variable attenuator 112 of FIG. 1) to adjust an attenuation of signal path 202 to cause the attenuation of signal path 202 to be substantially similar to the nominal attenuation of signal path 202.

As an example of comparing a test signal from front end 204 to a test signal from back end 206, the test signal from front end 204 and the test signal from back end 206 may be combined e.g., at coupler or summer. A degree to which the test signal from front end 204 and the test signal from back end 206 constructively or destructively interfere may be measured. For example, the combined signals may be input in a rectifier and an amplitude of the rectified signal may be indicative of the degree of constructive or destructive interference of the test signal from front end 204 with the test signal from back end 206.

According to example contemplated operations, controller 230 may modulate the phase shifter of signal path 202 e.g., controller 230 may cause the phase shifter to cycle through phases of a phase range. When the test signal from front end 204 is 180° out of phase with the test signal from back end 206 the test signal from front end 204 and the test signal from back end 206 will exhibit a greatest degree of destructive interference one with another. Thus, a phase of the phase range that causes a greatest degree of destructive interference between the test signal from front end 204 and the test signal from back end 206 may correspond to a 180° phase shift of the phase shifter.

Comparator 208 and/or controller 230 may determine a phase of phase shifter at which the test signal from front end 204 and the test signal from back end 206 exhibit a greatest degree of destructive interference and controller 230 may set the phases of the phase shifter such that the determined phase corresponds to a 180° phase shift. Alternatively, comparator 208 and/or controller 230 may determine a phase of phase shifter at which the test signal from front end 204 and the test signal from back end 206 exhibit a greatest degree of constructive interference and controller 230 may set the phases of the phase shifter such that the determined phase corresponds to a 0° phase shift.

Additionally or alternatively, comparator 208 and/or controller 230 may determine an attenuation of signal path 202 and may adjust the attenuation of signal path 202, e.g., such that the attenuation is within a threshold or close to a nominal attenuation. Comparator 208 and/or controller 230 may determine the attenuation by observing the degrees of constructive and destructive interference.

In some embodiments, signal path 202 may be arranged on RFIC 226. Additionally or alternatively, comparator 208, switch 228, controller 230, and/or test-signal provider 240 may also be arranged on RFIC 226.

Figure 3:
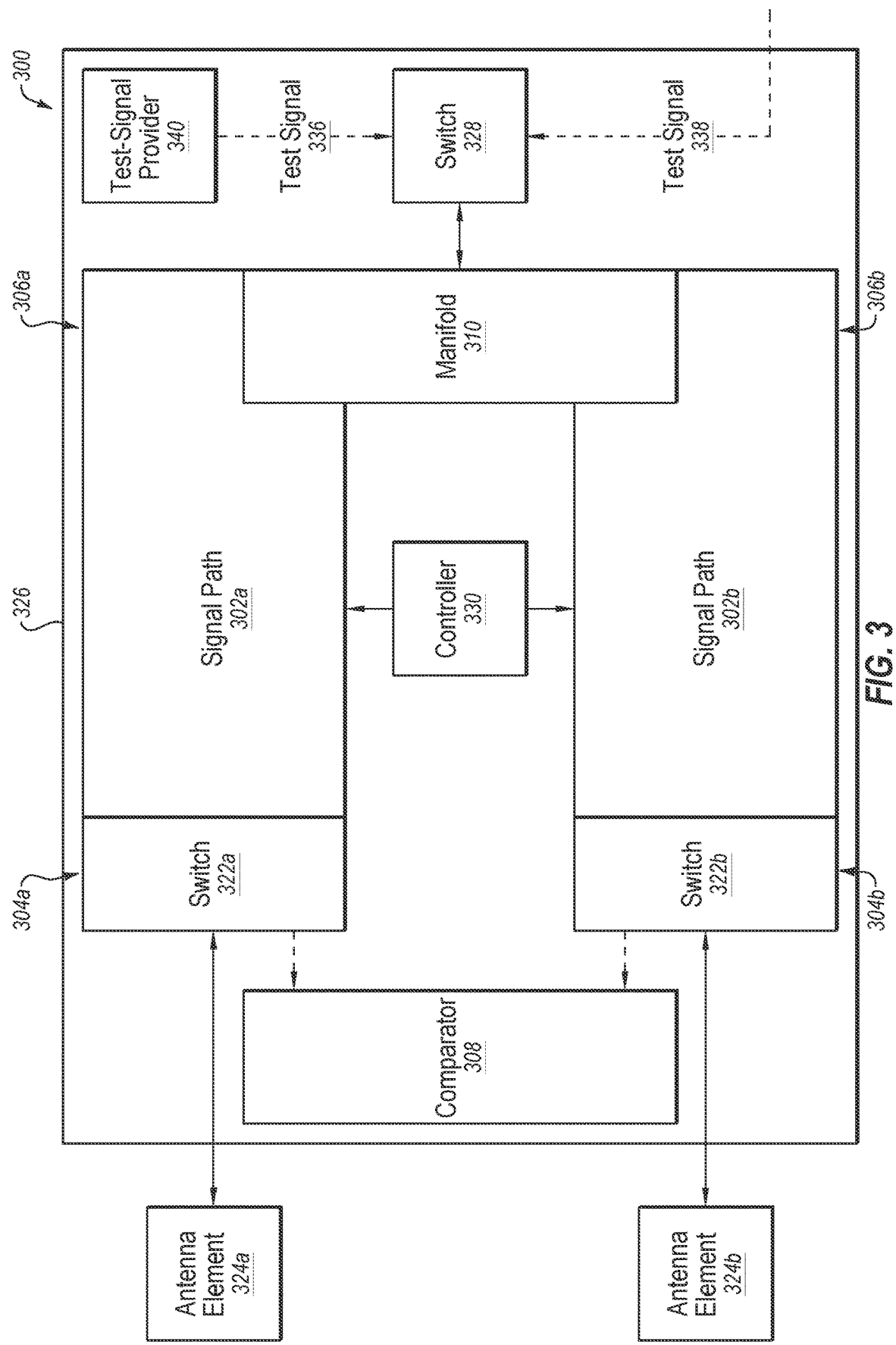
FIG. 3 is a functional block diagram illustrating another example device including a signal path and a signal path according to one or more embodiments.

FIG. 3 is a functional block diagram illustrating another example device 300 including a signal path 302a and a signal path 302b according to one or more embodiments. Signal path 102 of FIG. 1 may be an example of signal path 302a and of signal path 302b. Device 300 may compare a signal from a front end 304a of signal path 302a with a signal from front end 304b of signal path 302b. Device 300 may, responsive to the comparison, determine a status of signal path 302a and/or signal path 302b and/or adjust signal path 302a and/or signal path 302b.

Device 300 includes signal path 302a, which signal path 302a includes front end 304a for coupling to an antenna element 324a and a back end 306a for coupling to manifold 310. Device 300 includes signal path 302b, which signal path 302b includes front end 304b for coupling to an antenna element 324b and a back end 306b for coupling to manifold 310. Device 300 includes a comparator 308 coupled to front end 304a and coupled to front end 304b. Comparator 308 may compare a first signal from front end 304a with a second signal from front end 304b.

Comparator 308 may be the same as, be substantially similar to, and/or function substantially the same as, comparator 208 of FIG. 2. However, unlike comparator 208 of FIG. 2, comparator 308 may be coupled to front end 304a and coupled to front end 304b. Similar to comparator 208 of FIG. 2, comparator 308 may be coupled at any point of front end 304a of signal path 302a and at any point of front end 304b of signal path 302b.

Controller 330 may be the same as, be substantially similar to, and/or function substantially the same as, controller 230 of FIG. 2. However, controller 330 may control phase shifters and/or variable attenuators of signal path 302a and signal path 302b.

As an example of contemplated operations of device 300, test-signal provider 340 may provide a test signal 336 to signal path 302a and signal path 302b e.g., at switch 328 (or manifold 310). Test signal 336 may be a signal suitable for transmission at antenna element 324a and antenna element 324b. Test signal 336 may propagate through signal path 302a from back end 306a to front end 304a, e.g., to switch 322a and through signal path 302b from back end 306b to front end 304b, e.g., to switch 322b. Switch 322a and switch 322b may provide a signal, e.g., test signal 336 as test signal 336 was received at switch 322a and switch 322b respectively, to comparator 308.

As another example of contemplated operations of device 300, switch 328 (or manifold 310) may receive test signal 338. Test signal 338 may be a signal suitable for transmission at antenna element 324a and antenna element 324b. Test signal 338 may be provided to switch 328 from another manifold and/or another element of an antenna system. For example, test signal 338 may be generated by an array exciter. Test signal 338 may propagate through signal path 302a from back end 306a to front end 304a, e.g., to switch 322a and through signal path 302b from back end 306b to front end 304b, e.g., to switch 322b. Switch 322a and switch 322b may provide a signal, e.g., test signal 338 as test signal 338 was received at switch 322a and switch 322b respectively, to comparator 308.

According to either of the contemplated examples of operations above, or another example, comparator 308 may be coupled to front end 304a and to front end 304b. Comparator 308 may compare the phase and/or amplitude of a signal from front end 304a with the phase and/or amplitude of a signal from front end 304b.

In some embodiments, responsive to the comparison of the signal at front end 304a to the signal at front end 304b, comparator 308 and/or controller 330 may determine a status (e.g., an operability status) of one or both of signal path 302a and signal path 302b. For example, based on a determination that a phase shift imparted to the test signal by signal path 302b and/or an attenuation imparted to the test signal by signal path 302b are not within respective thresholds (e.g., thresholds of the specification of signal path 302b) from the test signal at front end 304a, comparator 308 and/or controller 330 may determine that signal path 302b is inoperative. In some embodiments, responsive to a determination that signal path 302b is inoperative, device 300 may determine not to use signal path 302b, additionally or alternatively, controller 330 may disable signal path 302b.

Additionally or alternatively, comparator 308 and/or controller 330 may adjust a phase shift and/or an attenuation of signal path 302b to cause the signal at front end 304b to be within the threshold range of the signal at front end 304a. For example, controller 330 may control a phase shifter (e.g., phase shifter 114 of FIG. 1, phase shifter not shown in FIG. 3) to adjust a phase shift imparted by signal path 302b to be substantially the same as the phase shift imparted by signal path 302a. Additionally or alternatively, controller 330 may control a variable attenuator (e.g., variable attenuator 112 of FIG. 1) to adjust an attenuation imparted by signal path 302b to cause the attenuation of signal path 302b to be substantially the same as the attenuation imparted by signal path 302a.

As an example of comparing a test signal from front end 304a to a test signal from front end 304b, the test signal from front end 304a and the test signal from front end 304b may be combined e.g., at coupler or summer. A degree to which the test signal from front end 304a and the test signal from front end 304b constructively or destructively interfere may be measured. For example, the combined signals may be input in a rectifier and an amplitude of the rectified signal may be indicative of the degree of constructive or destructive interference of the test signal from front end 304a and the test signal from front end 304b.

According to example contemplated operations, controller 330 may modulate the phase shifter of signal path 302b e.g., controller 330 may cause the phase shifter to cycle through phases of a phase range. When the test signal from front end 304b is 180° out of phase with the test signal from front end 304a the test signal from front end 304a and the test signal from front end 304b will exhibit a greatest degree of destructive interference one with another. Thus, a phase of the phase range that causes a greatest degree of destructive interference between the test signal from front end 304a and the test signal from front end 304b may correspond to a 180° difference between phases of the phase shifter of signal path 302a and the phase shifter of signal path 302b.

Comparator 308 and/or controller 330 may determine a phase of the phase shifter of signal path 302b relative to a phase of the phase shifter of signal path 302a at which the test signal from front end 304a and the test signal from front end 304b exhibit a greatest degree of destructive interference. Controller 330 may set the phases of the phase shifter of signal path 302b such that the determined phase corresponds to a 180° phase difference between the phase shifter of signal path 302b and the phase shifter of signal path 302a. Alternatively, comparator 308 and/or controller 330 may determine a phase of phase shifter at which the test signal from front end 304a and the test signal from front end 304b exhibit a greatest degree of constructive interference and controller 330 may set the phases of the phase shifter of signal path 302b such that the determined phase corresponds to a 0° phase difference between the between the phase shifter of signal path 302b and the phase shifter of signal path 302a.

Additionally or alternatively, comparator 308 and/or controller 330 may determine a difference between attenuation of signal path 302a attenuation of signal path 302b. Comparator 308 and/or controller 330 may adjust the attenuation of signal path 302a and/or signal path 302b e.g., such that the attenuation of signal path 302b is within a threshold range from the attenuation of signal path 302a. Comparator 308 and/or controller 330 may determine the attenuation by observing the degrees of constructive and destructive interference between the signal at front end 304a and the signal at front end 304b.

In some embodiments, signal path 302a and signal path 302b may be arranged on RFIC 326. In other embodiments, signal path 302a and signal path 302b may be arranged on separate RFICs (though not illustrated as such in FIG. 3). In such embodiments, signal path 302a and signal path 302b may nevertheless be coupled at a manifold 310.

Figure 4:
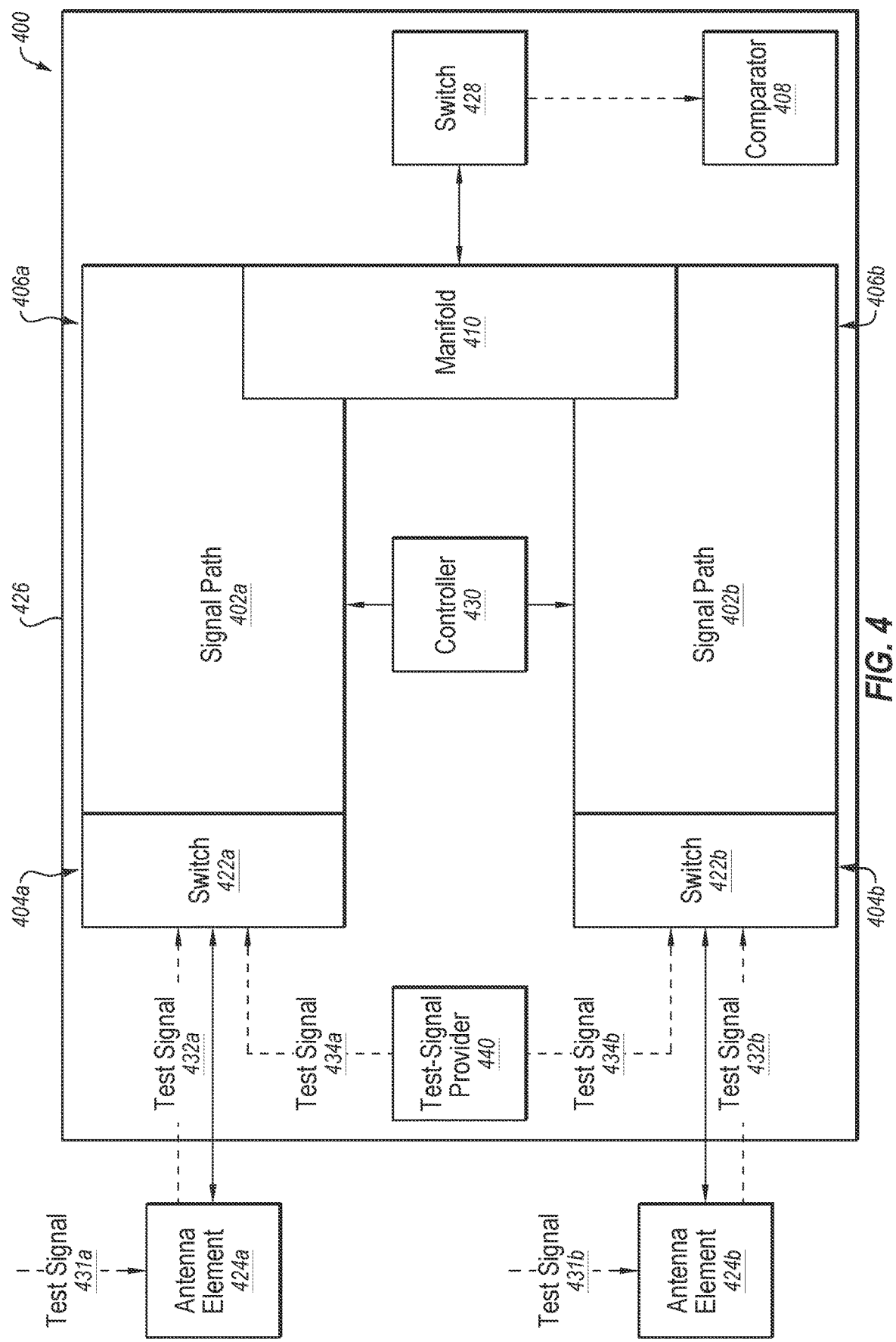
FIG. 4 is a functional block diagram illustrating yet another example device including a signal path and a signal path according to one or more embodiments.

FIG. 4 is a functional block diagram illustrating yet another example device 400 including a signal path 402a and a signal path 402b according to one or more embodiments. Signal path 102 of FIG. 1 may be an example of signal path 402a and of signal path 402b. Device 400 may compare a signal from a back end 406a of signal path 402a with a signal from back end 406b of signal path 402b. Device 400 may, responsive to the comparison, determine a status of signal path 402a and/or signal path 402b and/or adjust signal path 402a and/or signal path 402b.

Device 400 includes signal path 402a, which signal path 402a includes front end 404a for coupling to an antenna element 424a and a back end 406a for coupling to manifold 410. Device 400 includes signal path 402b, which signal path 402b includes front end 404b for coupling to an antenna element 424b and a back end 406b for coupling to manifold 410. Device 400 includes a comparator 408 coupled to back end 406a and coupled to back end 406b. Comparator 408 may compare a first signal from back end 406a with a second signal from back end 406b.

Comparator 408 may be the same as, be substantially similar to, and/or function substantially the same as, comparator 308 of FIG. 3 and/or comparator 208 of FIG. 2. However, unlike comparator 308 and comparator 208, comparator 408 may be coupled to back end 406a and coupled to back end 406b. Similar to comparator 208, comparator 408 may be coupled at any point of back end 406a of signal path 402a and at any point of back end 406b of signal path 402b.

As an example of contemplated operations of device 400, antenna element 424a may receive a test signal 431a and antenna element 424b may receive a test signal 431b. Test signal 431a and test signal 431b may be a signal propagating as an electromagnetic field, e.g., as received at antenna element 424a and antenna element 424b respectively. Antenna element 424a and antenna element 424b may be excited by the test signal. Test signal 431a and test signal 431b may have been transmitted by another antenna, e.g., in an antenna range to test a system, e.g., a system including signal path 402a and signal path 402b.

Continuing the example of contemplated operations, antenna element 424a may provide test signal 432a, which test signal 432a may be test signal 431a as test signal 431a was received at antenna element 424a, to signal path 402a at front end 404a, e.g., at switch 422a. Additionally, antenna element 424b may provide test signal 432b, which test signal 432a may be test signal 431b as test signal 431b was received at antenna element 424b, to signal path 402b at front end 404b, e.g., at switch 422b. Test signal 432a may propagate through signal path 402a from front end 404a to back end 406a, e.g., to manifold 410. Test signal 432b may propagate through signal path 402b from front end 404b to back end 406b, e.g., to manifold 410. Manifold 410 may provide a first signal, e.g., test signal 432a as test signal 432a was received at manifold 410, and a second signal, e.g., test signal 432b as test signal 432b was received at manifold 410, to switch 428. Switch 428 may provide the first signal and the second signal as they were respectively received at switch 428 (e.g., combined) to comparator 408. Alternatively, comparator 408 may be coupled to manifold 410 and may receive first and second signals as they were received at manifold 410 (e.g., combined).

As another example of contemplated operations of device 400, test-signal provider 440 may provide a test signal 434a to signal path 402a, e.g., at switch 422a and a test signal 434b to signal path 402b, e.g., at switch 422b. Test signal 434a and test signal 434b may replicate a signal that would be received at antenna element 424a and antenna element 424b respectively. Test signal 434a may propagate through signal path 402a from front end 404a to back end 406a, e.g., to manifold 410. Test signal 434b may propagate through signal path 402b from front end 404b to back end 406b, e.g., to manifold 410. Manifold 410 may provide a signal, e.g., test signal 434a and test signal 434b as test signal 434a and test signal 434b were received at manifold 410, to switch 428. Switch 428 may provide the signal as the signal was received at switch 428 (e.g., which signal may include a combination of test signal 434a and test signal 434b) to comparator 408. Alternatively, comparator 408 may receive be coupled to manifold 410 and may receive the signal e.g., including test signal 434a and test signal 434b as they were received at manifold 410 (e.g., combined).

According to either of the contemplated examples of operations above, or another example, comparator 408 may be coupled to back end 406a and to back end 406b. Comparator 408 may compare the phase and/or amplitude of a signal from back end 406a with the phase and/or amplitude of a signal from back end 406b.

In some embodiments, responsive to the comparison of the signal at 406a to the signal at back end 406b, comparator 408 and/or controller 430 may determine a status (e.g., an operability status) of one or both of signal path 402a and signal path 402b. For example, based on a determination that a phase shift imparted to the test signal by signal path 402b and/or an attenuation imparted to the test signal by signal path 402b are not within respective thresholds (e.g., thresholds of the specification of signal path 402b) from the test signal at back end 406a, comparator 408 and/or controller 430 may determine that signal path 402b is inoperative. In some embodiments, responsive to a determination that signal path 402b is inoperative, device 400 may determine not to use signal path 402b, additionally or alternatively, controller 430 may disable signal path 402b.

Additionally or alternatively, comparator 408 and/or controller 430 may adjust a phase shift and/or an attenuation of signal path 402b to cause the signal at back end 406b to be within the threshold range of the signal at back end 406a. For example, controller 430 may control a phase shifter (e.g., phase shifter 114 of FIG. 1, phase shifter not shown in FIG. 4) to adjust a phase shift of signal path 402b to cause the phase shift imparted by signal path 402b to be substantially similar to the phase shift imparted by signal path 402a. Additionally or alternatively, controller 430 may control a variable attenuator (e.g., variable attenuator 112 of FIG. 1) to adjust an attenuation imparted by signal path 402b to cause the attenuation of signal path 402b to be substantially similar to the attenuation imparted by signal path 402a.

As an example of comparing a test signal from back end 406a to a test signal from back end 406b, the test signal from back end 406a and the test signal from back end 406b may be combined e.g., manifold 410. A degree to which the test signal from back end 406a and the test signal from back end 406b constructively or destructively interfere may be measured. For example, the combined signals may be input in a rectifier and an amplitude of the rectified signal may be indicative of the degree of constructive or destructive interference of the test signal from back end 406a and the test signal from back end 406b.

According to example contemplated operations, controller 430 may modulate the phase shifter of signal path 402b e.g., controller 430 may cause the phase shifter to cycle through phases of a phase range. When the test signal from back end 406b is 180° out of phase with the test signal from back end 406a the test signal from back end 406a and the test signal from back end 406b will exhibit a greatest degree of destructive interference one with another. Thus, a phase of the phase range that causes a greatest degree of destructive interference between the test signal from back end 406a and the test signal from back end 406b may correspond to a 180° difference between phases of the phase shifter of signal path 402a and the phase shifter of signal path 402b.

Comparator 408 and controller 430 may determine a phase of the phase shifter of signal path 402b relative to a phase of the phase shifter of signal path 402a at which the test signal from back end 406a and the test signal from back end 406b exhibit a greatest degree of destructive interference. Controller 430 may set the phases of the phase shifter of signal path 402b such that the determined phase corresponds to a 180° phase difference between the phase shifter of signal path 402b and the phase shifter of signal path 402a. Alternatively, comparator 408 and controller 430 may determine a phase of phase shifter at which the test signal from back end 406a and the test signal from back end 406b exhibit a greatest degree of constructive interference and controller 430 may set the phases of the phase shifter of signal path 402b such that the determined phase corresponds to a 0° phase difference between the between the phase shifter of signal path 402b and the phase shifter of signal path 402a.

Additionally or alternatively, comparator 408 and controller 430 may determine a difference between attenuation of signal path 402a attenuation of signal path 402b. Comparator 408 and controller 430 may adjust the attenuation of signal path 402a and/or signal path 402b e.g., such that the attenuation of signal path 402b is within a threshold range from the attenuation of signal path 402a. Comparator 408 and controller 430 may determine the attenuation by observing the degrees of constructive and destructive interference between the signal at back end 406a and the signal at back end 406b.

Figure 5:
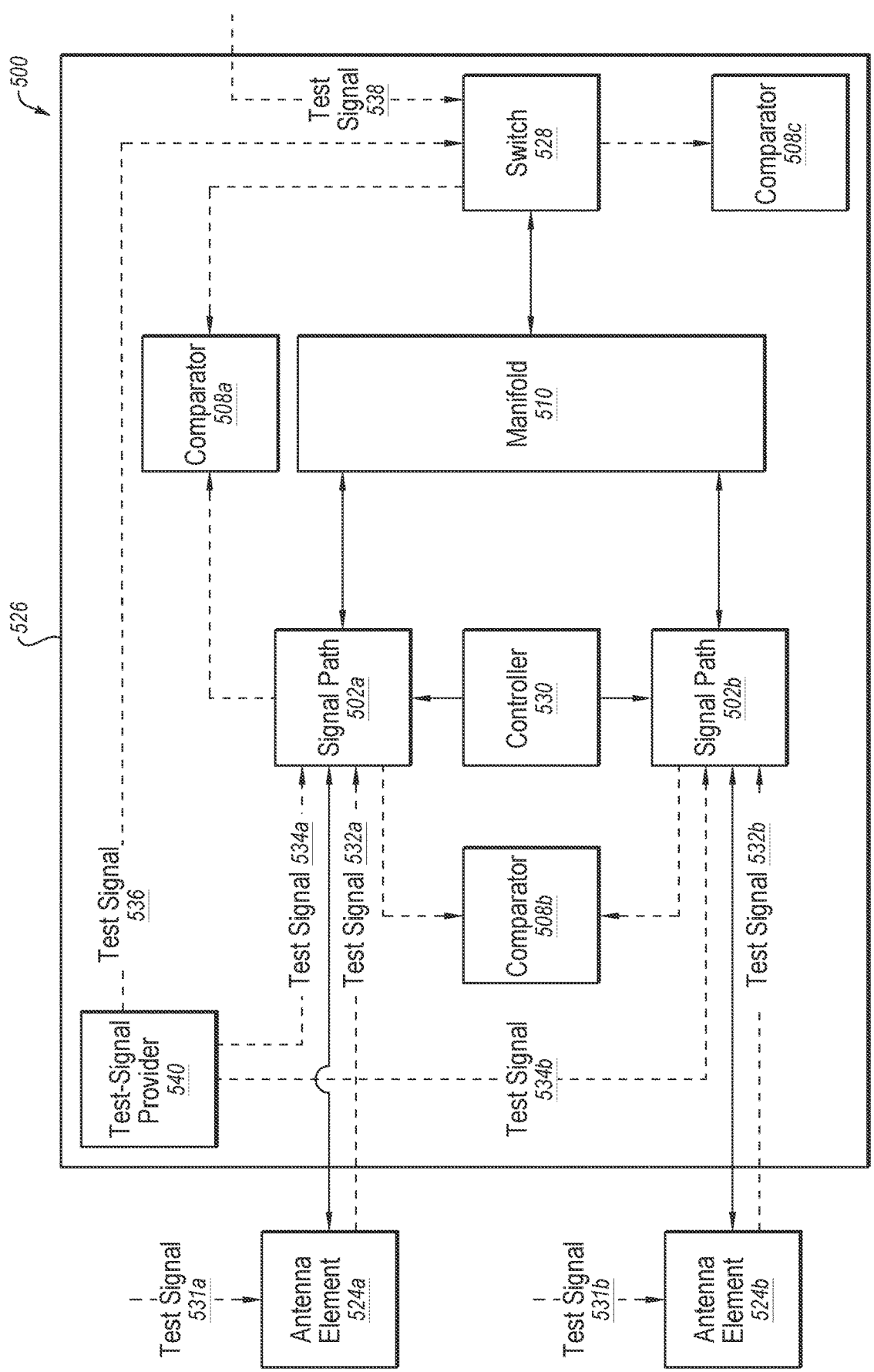
FIG. 5 is a functional block diagram illustrating yet another example device including a signal path and a signal path according to one or more embodiments.

FIG. 5 is a functional block diagram illustrating yet another example device 500 including a signal path 502a and a signal path 502b according to one or more embodiments. Signal path 102 of FIG. 1 may be an example of signal path 502a and of signal path 502b. Device 500 may include one or more of comparator 508a, comparator 508b, and comparator 508c to compare various signals from various points of signal path 502a and signal path 502b. Device 500 may, responsive to the comparison, determine a status of signal path 502a and/or signal path 502b and/or adjust signal path 502a and/or signal path 502b.

Device 500 may include comparator 508a, which comparator 508a may be the same as, be substantially similar to, and/or function substantially the same as, comparator 208 of FIG. 2. For example, comparator 508a may compare a signal from front end 504a with a signal from back end 506a. Controller 530 may adjust a phase shifter of signal path 502a responsive to the comparison.

Device 500 may include comparator 508b, which comparator 508b may be the same as, be substantially similar to, and/or function substantially the same as, comparator 308 of FIG. 3. For example, comparator 508b may compare a signal from front end 504a with a signal from front end 504b. Controller 530 may adjust a phase shifter of either of signal path 502a or signal path 502b responsive to the comparison.

Device 500 may include comparator 508c, which comparator 508c may be same as, be substantially similar to, and/or function substantially the same as, comparator 408 of FIG. 4. For example, comparator 508c may compare a signal from back end 506a with a signal from back end 506b. Controller 530 may adjust a phase shifter of either of signal path 502a or signal path 502b responsive to the comparison.

Figure 6:
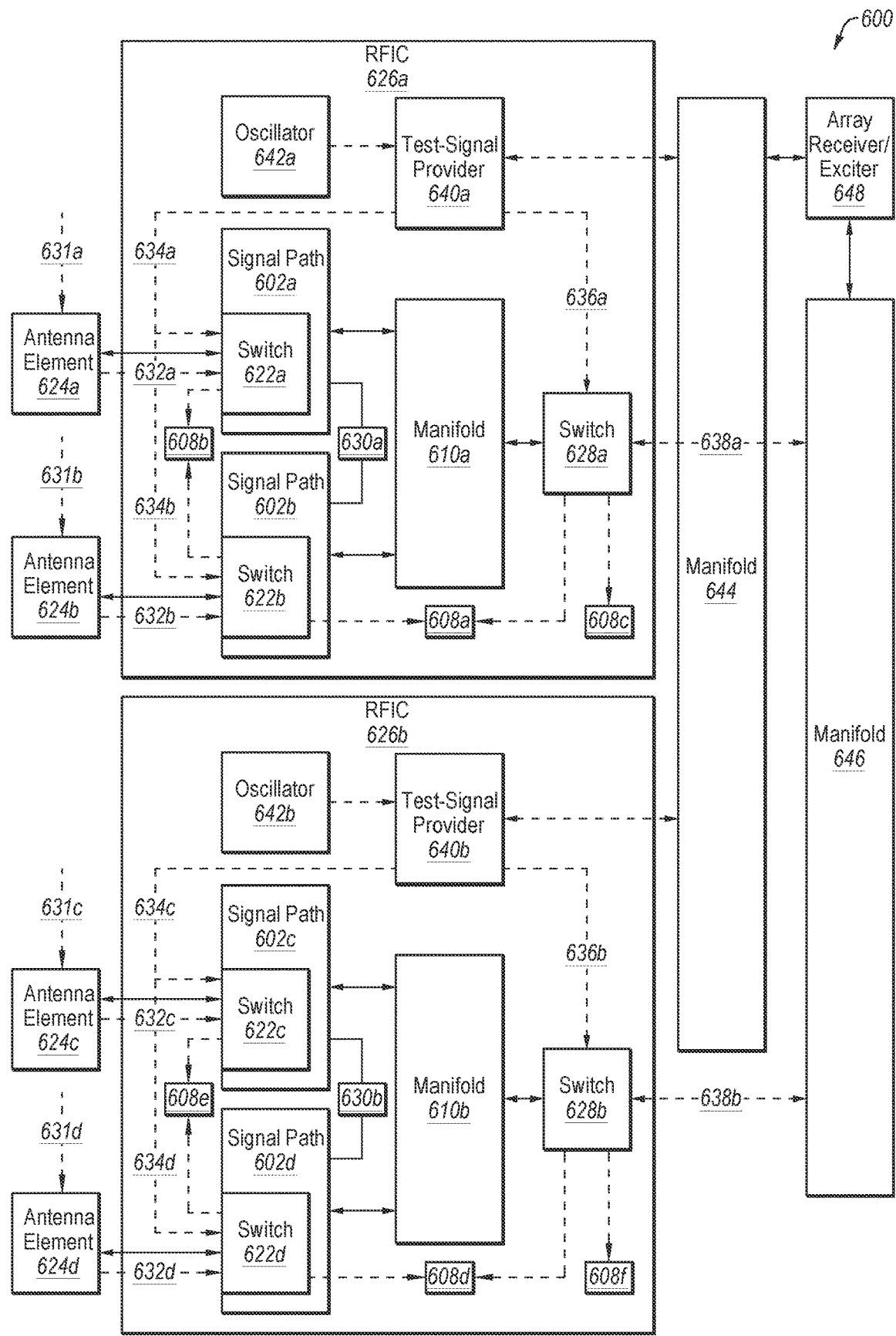
FIG. 6 is a functional block diagram illustrating an example system including a multiple signal paths according to one or more embodiments.

FIG. 6 is a functional block diagram illustrating an example system 600 including a multiple signal paths according to one or more embodiments. Signal path 102 of FIG. 1 may be an example of signal path 602a, of signal path 602b, of signal path 602c, and of signal path 602d. System 600 may include one or more of comparator 608a, comparator 608b, comparator 608c, comparator 608d, comparator 608e, and comparator 608f to compare various signals from various points of signal path 602a, signal path 602b, signal path 602c, and signal path 602d. System 600 may, responsive to the comparison, determine a status of signal path 602a, signal path 602b, signal path 602c, and signal path 602d and/or adjust signal path 602a, signal path 602b, signal path 602c, and signal path 602d.

System 600 includes signal path 602a and signal path 602b and signal path 602c and signal path 602d which may same as, be substantially similar to, and/or function substantially the same as, signal path 502a of FIG. 5 and signal path 502b of FIG. 5 respectively. Signal path 602a and signal path 602b are coupled to manifold 610a and switch 628a, which manifold 610a and switch 628a may be same as, be substantially similar to, and/or function substantially the same as, manifold 510 of FIG. 5 and switch 528 respectively. Signal path 602c and signal path 602d are similarly coupled to manifold 610b and switch 628b, which manifold 610b and switch 628b may be same as, be substantially similar to, and/or function substantially the same as, manifold 510 and switch 528 respectively. System 600 may include controller 630a to control a phase shifter and/or variable attenuator of signal path 602a and signal path 602b respectively. System 600 may include controller 630b to control a phase shifter and/or variable attenuator of signal path 602c and signal path 602d respectively. Controller 630a and controller 630b may be same as, be substantially similar to, and/or function substantially the same as, controller 530 of FIG. 5. System 600 includes test-signal provider 640a, which test-signal provider 640a may provide test signal 634a to signal path 602a, test signal 634b to signal path 602b, and test signal 636a to switch 628a. System 600 includes test-signal provider 640b, which test-signal provider 640b may provide test signal 634c to signal path 602c, test signal 634d to signal path 602d, and test signal 636b to switch 628b. Test-signal provider 640a and test-signal provider 640b may be same as, be substantially similar to, and/or function substantially the same as, test-signal provider 540 of FIG. 5. Signal path 602a, signal path 602b, manifold 610a, switch 628a, and test-signal provider 640a may be arranged on RFIC 626a. Signal path 602c, signal path 602d, manifold 610b, switch 628b, and test-signal provider 640b may be arranged on RFIC 626b. RFIC 626a and RFIC 626b may be same as, be substantially similar to, and/or function substantially the same as, RFIC 526 of FIG. 5.

Additionally, system 600 may include oscillator 642a, which oscillator 642a may generate an oscillating signal and provide the oscillating signal to test-signal provider 640a. Test-signal provider 640a may provide the oscillating signal generated by oscillator 642*a* to signal path 602*a*, signal path 602*b*, and/or switch 628*a*, as test signal 634*a*, test signal 634*b*, and/or test signal 636*a* respectively. Oscillator 642*a* may be arranged on RFIC 626*a*.

Additionally, system 600 may include oscillator 642*b*, which oscillator 642*b* may generate an oscillating signal and provide the oscillating signal to test-signal provider 640*b*. Test-signal provider 640*b* may provide the oscillating signal generated by oscillator 642*b* to signal path 602*c*, signal path 602*d*, and/or switch 628*b*, as test signal 634*c*, test signal 634*d*, and/or test signal 636*b* respectively. Oscillator 642*b* may be arranged on RFIC 626*b*.

Additionally, system 600 includes array receiver/exciter 648. Array receiver/exciter 648 may generate an oscillating signal and provide the oscillating signal to test-signal provider 640*a* and test-signal provider 640*b* through manifold 644. Test-signal provider 640*a* may provide the oscillating signal generated by array receiver/exciter 648 to signal path 602*a*, signal path 602*b*, and/or switch 628*a*, as test signal 634*a*, test signal 634*b*, and/or test signal 636*a* respectively. Test-signal provider 640*b* may provide the oscillating signal generated by array receiver/exciter 648 to signal path 602*c*, signal path 602*d*, and/or switch 628*b*, as test signal 634*c*, test signal 634*d*, and/or test signal 636*b* respectively.

Additionally or alternatively, array receiver/exciter 648 may generate an oscillating signal and provide the oscillating signal to signal path 602*a* and signal path 602*b* through manifold 646, switch 628*a*, and manifold 610*a* and as test signal 638*a*. Additionally or alternatively, array receiver/exciter 648 may generate an oscillating signal and provide the oscillating signal to signal path 602*c* and signal path 602*d* through manifold 646, switch 628*b*, and manifold 610*b* and as and test signal 638*b*.

Additionally or alternatively, array receiver/exciter 648 may perform some of the operations described above with regard to any of the comparators described above (e.g., comparator 208 of FIG. 2, comparator 308 of FIG. 3, comparator 408 of FIG. 4, comparator 508*a* of FIG. 5, comparator 508*b* of FIG. 5, and/or comparator 508*c* of FIG. 5).

For example, array receiver/exciter 648 may generate an oscillating signal and provide the oscillating signal to manifold 644. Manifold 644 may provide the oscillating signal to test-signal provider 640*a* and test-signal provider 640*b*. Test-signal provider 640*a* and test-signal provider 640*b* may provide the oscillating signal to switch 622*a* as test signal 634*a*, to switch 622*b* as test signal 634*b*, to switch 622*c* as test signal 634*c*, and to switch 622*d* as test signal 634*d* respectively. The test signals may propagate through signal path 602*a*, signal path 602*b*, signal path 602*c*, and signal path 602*d* respectively to arrive at manifold 610*a*, switch 628*a*, manifold 610*b*, and switch 628*b*. The test signals may arrive at manifold 646 and may be provided back to array receiver/exciter 648. Array receiver/exciter 648 may then perform one or more of the comparisons described above with regard to comparator 208, comparator 408, comparator 508*a*, and/or comparator 508*c*.

For example, array receiver/exciter 648 may cause controller 630*a* and/or controller 630*b* to activate, one at a time, signal path 602*a*, signal path 602*b*, signal path 602*c*, and signal path 602*d*. With only one of signal path 602*a*, signal path 602*b*, signal path 602*c*, and signal path 602*d* active, array receiver/exciter 648 may compare the test signal provided to the front end of the signal path (e.g., through manifold 644) with the test signal from the back end of the signal path (e.g., as received by array receiver/exciter 648 at manifold 646). Such a comparison, may be similar to some of the comparisons made by comparator 208 of FIG. 2. Using such comparisons, array receiver/exciter 648 may be able to determine a status of a signal path and/or to cause a controller (e.g., controller 630*a* and/or controller 630*b*) to adjust the signal path, e.g., as described above with regard to comparator 208.

As another example, array receiver/exciter 648 may cause controller 630*a* and/or controller 630*b* to activate, two, or more, at a time, signal path 602*a*, signal path 602*b*, signal path 602*c*, and signal path 602*d*. With two of the signal paths active, array receiver/exciter 648 may compare the output at the back ends of the signal paths with each other. For example, array receiver/exciter 648 may observe the effects of constructive and/or destructive interference of the two signals at manifold 646. Such a comparison, may be similar to some of the comparisons made by comparator 408 of FIG. 4. Using such comparisons, array receiver/exciter 648 may be able to determine a status of a signal path relative to another signal path and/or to cause a controller (e.g., controller 630*a* and/or controller 630*b*) to adjust one or both of the signal paths e.g., to cause the phase shifts and/or amplitudes imparted by the signal paths to be the same, e.g., as described above with regard to comparator 408. In such comparisons, array receiver/exciter 648 may compare signal paths from the same RFIC of from separate RFICs. For example, array receiver/exciter 648 may compare signal path 602*a* of RFIC 626*a* to signal path 602*b* of RFIC 626*a* or array receiver/exciter 648 may compare signal path 602*a* of RFIC 626*a* to signal path 602*c* of RFIC 626*b*.

As another example, array receiver/exciter 648 may generate an oscillating signal and provide the oscillating signal to manifold 646. Manifold 646 may provide the oscillating signal to switch 628*a* and switch 628*b*. Switch 628*a* and switch 628*b* may provide the oscillating signal to switch 628*a* as test signal 638*a* and to switch 628*b* as test signal 638*b* respectively. The test signals may propagate through manifold 610*a*, signal path 602*a*, signal path 602*b*, manifold 610*b*, signal path 602*c*, and signal path 602*d* respectively to arrive at test-signal provider 640*a* and test-signal provider 640*b* respectively. Test-signal provider 640*a* and test-signal provider 640*b* may provide the respective test signals, as they arrived at test-signal provider 640*a* and test-signal provider 640*b* respectively to manifold 644. The respective test signals may arrive at manifold 644 and may be provided back to array receiver/exciter 648 (e.g., after having been combined at manifold 644). Array receiver/exciter 648 may then perform one or more of the comparisons described above with regard to comparator 208, comparator 308, comparator 508*a*, and/or comparator 508*b*.

For example, array receiver/exciter 648 may cause controller 630*a* and/or controller 630*b* to activate, one at a time, signal path 602*a*, signal path 602*b*, signal path 602*c*, and signal path 602*d*. With only one of signal path 602*a*, signal path 602*b*, signal path 602*c*, and signal path 602*d* active, array receiver/exciter 648 may compare a test signal provided to the back end of the signal path (e.g., through manifold 646) with a test signal from the front end of the signal path (e.g., as received by array receiver/exciter 648 at manifold 644). Such a comparison, may be similar to some of the comparisons made by comparator 208 of FIG. 2. Using such comparisons, array receiver/exciter 648 may be able to determine a status of a signal path and/or to cause a controller (e.g., controller 630*a* and/or controller 630*b*) to adjust a signal path, e.g., as described above with regard to comparator 208.

As another example, array receiver/exciter 648 may cause controller 630*a* and/or controller 630*b* to activate, two, or more, at a time, signal path 602a, signal path 602b, signal path 602c, and signal path 602d. With two of the signal paths active, array receiver/exciter 648 may compare the output at the front ends of the signal paths with each other. For example, array receiver/exciter 648 may observe the effects of constructive and/or destructive interference of the two signals at manifold 644. Such a comparison, may be similar to some of the comparisons made by comparator 308 of FIG. 3. Using such comparisons, array receiver/exciter 648 may be able to determine a status of a signal path relative to another signal path and/or to cause a controller (e.g., controller 630a and/or controller 630b) to adjust one or both of the signal paths e.g., to cause the phase shifts and/or amplitudes imparted by the signal paths to be the same, e.g., as described above with regard to comparator 308. In such comparisons, array receiver/exciter 648 may compare signal paths from the same RFIC of from separate RFICs. For example, array receiver/exciter 648 may compare signal path 602a of RFIC 626a to signal path 602b of RFIC 626a or array receiver/exciter 648 may compare signal path 602a of RFIC 626a to signal path 602c of RFIC 626b.

As another example, antenna element 624a may receive test signal 632a, antenna element 624b may receive test signal 632b, antenna element 624c may receive test signal 632c, and antenna element 624d may receive test signal 632d. Test signal 632a may propagate through signal path 602a, manifold 610a, switch 628a, and manifold 646 to array receiver/exciter 648. Test signal 632b may propagate through signal path 602b, manifold 610a, switch 628a, and manifold 646 to array receiver/exciter 648. Test signal 632c may propagate through signal path 602c, manifold 610b, switch 628b, and manifold 646 to array receiver/exciter 648. Test signal 632d may propagate through signal path 602d, manifold 610b, switch 628b, and manifold 646 to array receiver/exciter 648. Array receiver/exciter 648 may perform any of the comparisons and/or adjustments described above responsive to test signal 632a, test signal 632b, test signal 632c, and test signal 632d. For example, receiver/exciter 648 may analyze and/or adjust any of signal path 602a, signal path 602b, signal path 602c, and signal path 602d one at a time (e.g., as described with regard to comparator 208) or two, or more, at a time (e.g., as described above with regard to comparator 408).

Figure 7:
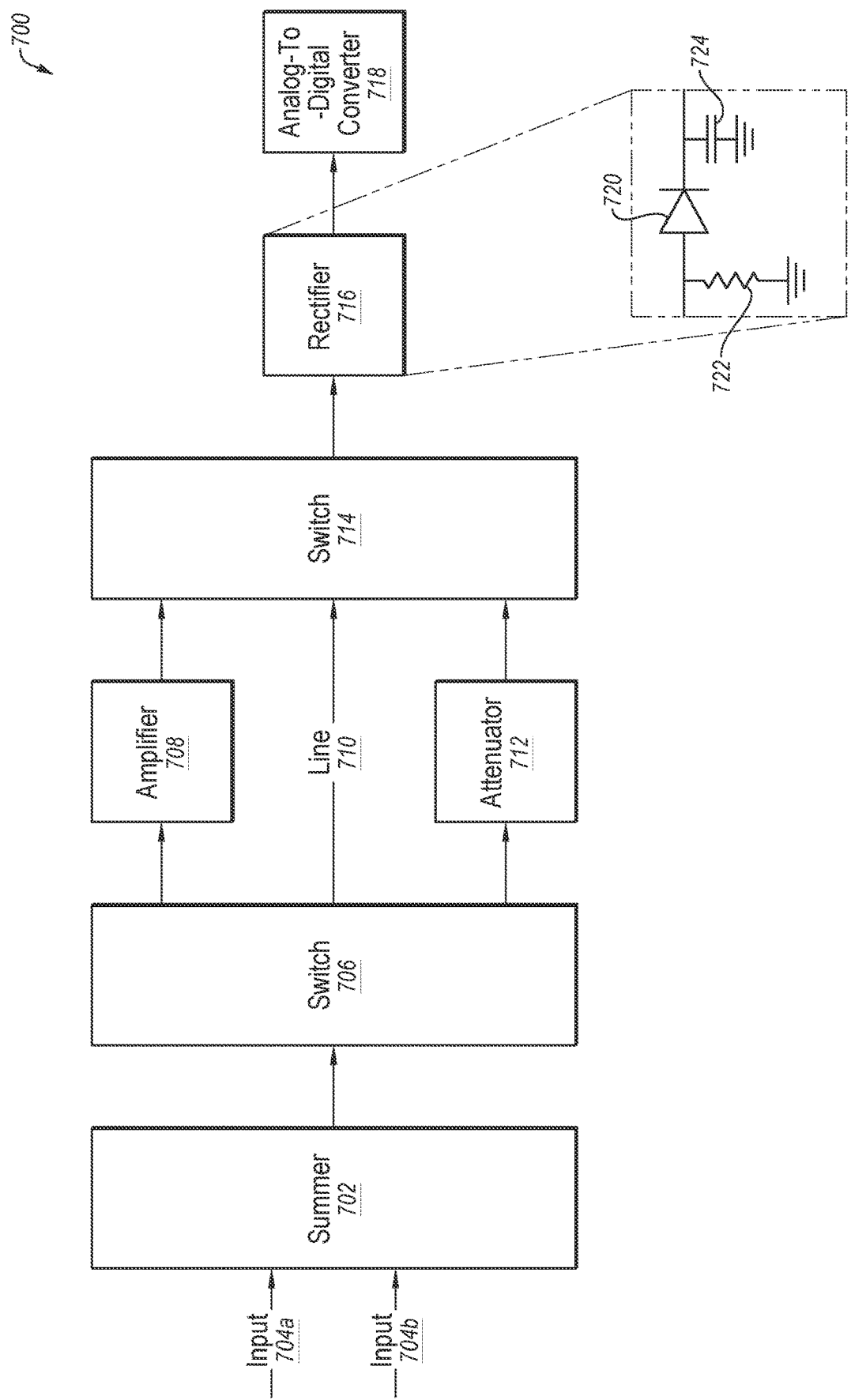
FIG. 7 is a functional block diagram illustrating an example comparator according to one or more embodiments.

FIG. 7 is a functional block diagram illustrating an example comparator 700 according to one or more embodiments. Comparator 700 may be an example of any of comparator 208 of FIG. 2, comparator 308 of FIG. 3, comparator 408 of FIG. 4, comparator 508a of FIG. 5, comparator 508b of FIG. 5, comparator 508c of FIG. 5, comparator 608a of FIG. 6, comparator 608b of FIG. 6, comparator 608c of FIG. 6, comparator 608d of FIG. 6, comparator 608e of FIG. 6, and/or comparator 608f of FIG. 6. Further, array receiver/exciter 648 of FIG. 6 may include an instance of comparator 700. Comparator 700 may include a summer 702, two multi-way switches (switch 706 and switch 714) a rectifier 716, and an analog-to-digital converter 718.

At summer 702 input signal 704a may be combined with input signal 704b. Input signal 704a and input signal 704b may be oscillating signals (e.g., test signals). Input signal 704a and input signal 704b may or may not have the same phase. Inasmuch as input signal 704a and input signal 704b do not have the same phase, input signal 704a and input signal 704b may destructively interfere one with another. In some embodiments, summer 702 may be a manifold external to 700, or, operations of comparator 700 performed by a manifold external to comparator 700. For example, manifold 410 of FIG. 4 may perform the operations of summer 702 in comparator 408 of FIG. 4.

Comparator 700 may include switch 706, switch 714, and alternative paths therebetween. Switch 706 and switch 714 may be multi-way switches. Switch 706, switch 714, and the alternative paths therebetween may increase a dynamic range of the comparator. For example, switch 706, switch 714, and the alternative paths therebetween may increase the range of signal amplitudes that can be measured e.g., at analog-to-digital converter 718. For example, one of the alternative paths may be selected based on a signal strength of a signal at summer 702. One or more of the alternative paths may increase an amplitude of the signal at summer 702. For example, a first path includes amplifier 708, which amplifier 708 may amplify a signal at summer 702. One or more of the alternative paths may neither increase nor decrease an amplitude of the signal at summer 702. For example, a second path includes line 710, which line 710 may provide the signal at summer 702 to rectifier 716 without amplification or attenuation. One or more of the alternative paths may decrease an amplitude of the signal at summer 702. For example, a third path includes attenuator 712, which attenuator 712 may attenuate a signal at summer 702.

Rectifier 716 may convert the combined oscillating signal into a direct current signal with an amplitude indicative of the constructive interference or destructive interference between input signal 704a and input signal 704b. For example, rectifier 716 may include a diode 720 between an input of rectifier 716 and an output of rectifier 716. Rectifier 716 may further include a resistor 722 between the input of rectifier 716 and ground and a capacitor 724 between the output of rectifier 716 and ground.

Analog-to-digital converter 718 may convert the rectified signal from rectifier 716 into a digital signal suitable for digital logic e.g., digital logic of a comparator. Analog-to-digital converter 718 may include a circuit (not illustrated in FIG. 7) to reset voltages of comparator 700 between measurements, e.g., by discharging capacitor 724.

Figure 8:
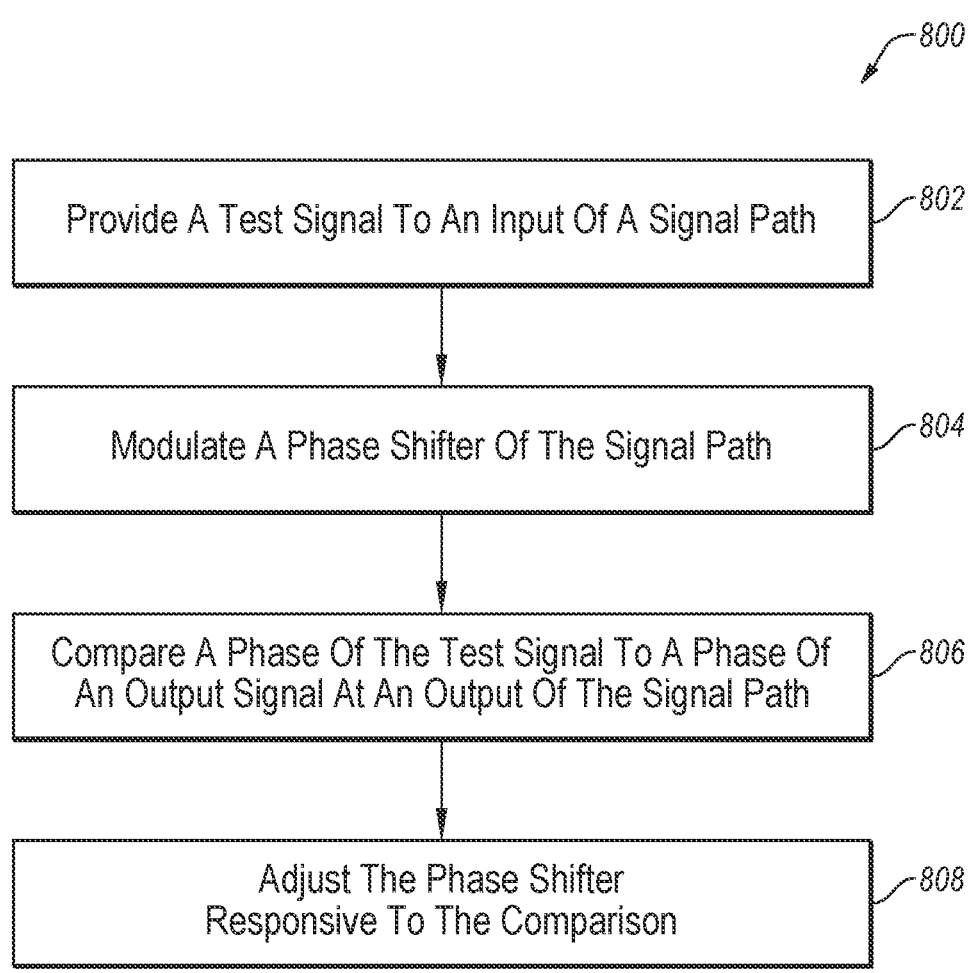
FIG. 8 is a flowchart of an example method according to one or more embodiments.

FIG. 8 is a flowchart of an example method 800 according to one or more embodiments. At least a portion of method 800 may be performed, in some examples, by a device or system, such as device 200 of FIG. 2, device 500 of FIG. 5, system 600 of FIG. 6, device 1100 of FIG. 11, or another device or system. Although illustrated as discrete blocks, various blocks may be divided into additional blocks, combined into fewer blocks, or eliminated, depending on the desired implementation.

At block 802, a test signal may be provided to an input of a signal path. For example, test signal 232 of FIG. 2 or test signal 234 of FIG. 2 may be provided at front end 204 of FIG. 2 of signal path 202 of FIG. 2. In such an example, front end 204 may be the input of signal path 202. As an alternative example, test signal 236 of FIG. 2 or test signal 238 of FIG. 2, may be provided at back end 206 of FIG. 2 of signal path 202. In such an example, back end 206 may be the input of signal path 202.

At block 804, a phase shifter of the signal path may be modulated. For example, phase shifter 114 of FIG. 1 may be modulated. Modulating the phase shifter may be, or may include, cycling the phase shifter through a phase range.

At block 806, a phase of the test signal may be compared to a phase of an output signal at an output of the signal path. For example, returning to the first example given with regard to block 802, test signal 232 or test signal 234 may be compared with a signal at back end 206 of signal path 202. In such a case, back end 206 is the output of signal path 202.

Returning to the second example given with regard to block 802, test signal 236 or test signal 238 may be compared with a signal at front end 204 of signal path 202. In such a case, front end 204 is the output of signal path 202.

At block 808, the phase shifter may be adjusted responsive to the comparison. For example, a correspondence between phases selected in a control signal and phase shifting in the phase shifter may be adjusted. Alternatively, the phase shifter and/or the signal path may be disabled, e.g., responsive to a determination that the phase shifter or the signal path is not shifting phases correctly.

In some embodiments, block 804 may include cycling the phase shifter through a phase range. Block 806 may include determining a phase of the phase range that results in a greatest difference between the phase of the test signal and the phase of the output signal. Block 808 may include adjusting the phase shifter such that the determined phase corresponds to a 180° phase shift in the phase shifter.

In some embodiments, block 804 may include cycling the phase shifter through a phase range. Block 806 may include combining the test signal and the output signal and determining a phase of the phase range at which the test signal and the output signal substantially cancel each other. Block 808 may include adjusting the phase shifter such that the determined phase corresponds to a 180° phase shift in the phase shifter.

In some embodiments, block 804 may include cycling the phase shifter through a phase range. Block 806 and block 808 collectively may include iteratively adjusting a phase of the phase shifter and comparing the phase of the test signal to the phase of the output signal to determine a phase of the phase range that results in a greatest difference between the phase of the test signal and the phase of the output signal.

In some embodiments, method 800 may additionally include adjusting the signal path (e.g., adjusting a variable attenuator (e.g., variable attenuator 112)) such that an amplitude of the output signal is substantially the same as an amplitude of the test signal.

Figure 9:
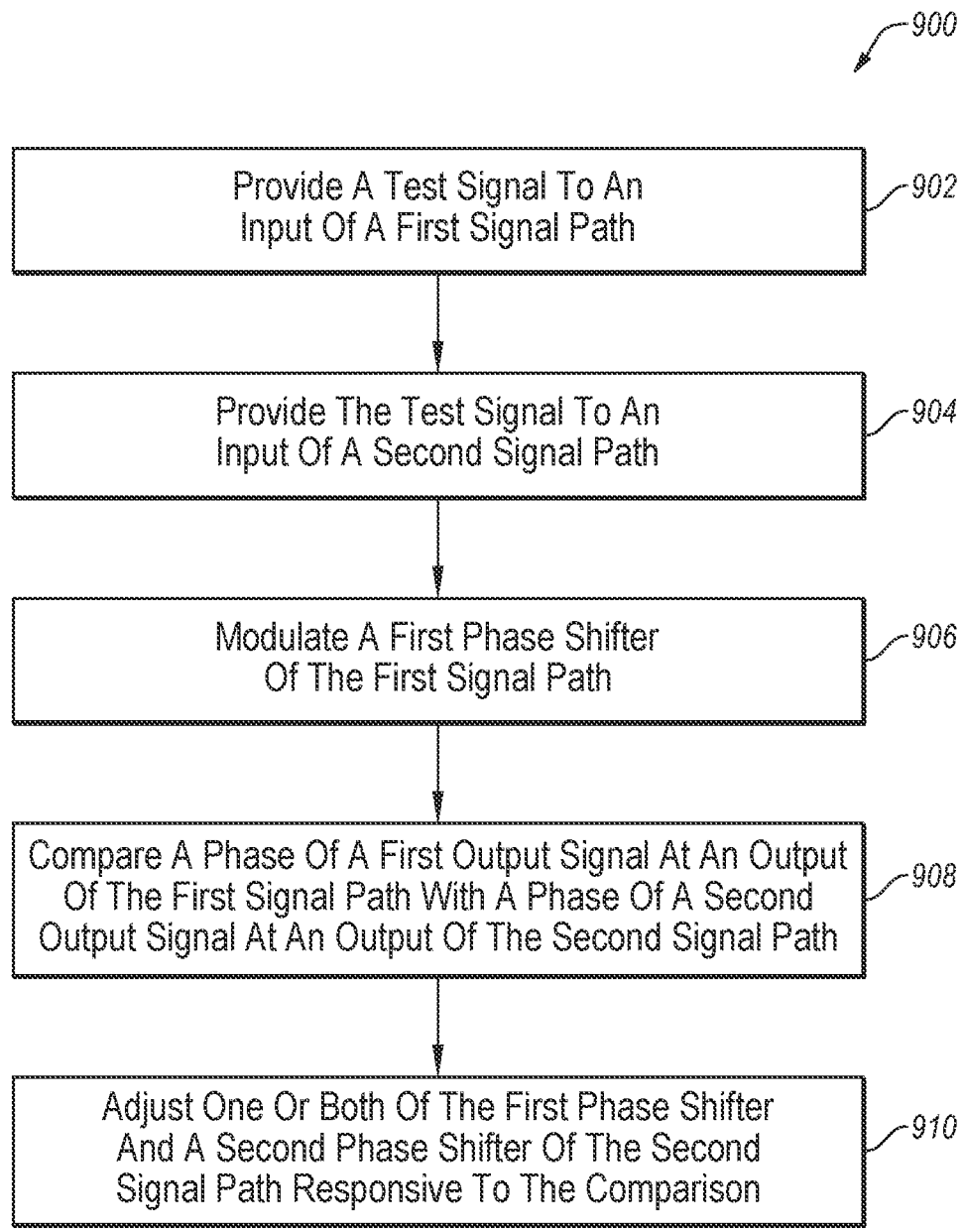
FIG. 9 is a flowchart of another example method according to one or more embodiments.

FIG. 9 is a flowchart of another example method 900 according to one or more embodiments. At least a portion of method 900 may be performed, in some examples, by a device or system, such as device 300 of FIG. 3, device 400 of FIG. 4, device 500 of FIG. 5, system 600 of FIG. 6, device 1100 of FIG. 11, or another device or system. Although illustrated as discrete blocks, various blocks may be divided into additional blocks, combined into fewer blocks, or eliminated, depending on the desired implementation.

At block 902, a test signal may be provided to an input of a first signal path.

At block 904, the test signal may be provided to an input of a second signal path.

As an example of block 902, test signal 336 of FIG. 3 or test signal 338 of FIG. 3 may be provided at back end 306a of FIG. 3 of signal path 302a of FIG. 3. As an example of block 904, test signal 336 or test signal 338 may be provided at back end 306b of FIG. 3 of signal path 302b of FIG. 3. In such examples, back end 306a and back end 306b may be the inputs of signal path 302a and signal path 302b respectively.

As an alternative example of block 902, test signal 432a of FIG. 4 or test signal 434a of FIG. 4 may be provided at front end 404a of FIG. 4 of signal path 402a of FIG. 4. As an example of block 904, test signal 432b of FIG. 4 or test signal 434b of FIG. 4 may be provided at front end 404b of FIG. 4 of signal path 402b of FIG. 4. In such examples, front end 404a and front end 404b may be the inputs of signal path 402a and signal path 402b respectively.

At block 906, a phase shifter of the first signal path may be modulated. For example, phase shifter 114 of FIG. 1 may be modulated. Modulating the phase shifter may be, or may include, cycling the phase shifter through a phase range.

At block 908, a phase of a first output signal at an output of the first signal path may be compared with a phase of a second output signal at an output of the second signal path. For example, returning to the first example given with regard to block 902 and block 904, a signal at front end 304a of FIG. 3 of signal path 302a may be compared with a signal at front end 304b of FIG. 3 of signal path 302b. In such a case, front end 304a and front end 304b may be respective outputs of signal path 302a and signal path 302b. Returning to the second example given with regard to block 902 and block 904, a signal at back end 406a of FIG. 4 of signal path 402a may be compared with a signal at back end 406b of FIG. 4 of signal path 402b. In such a case, back end 406a and back end 406b may be respective outputs of signal path 402a and signal path 402b.

At 910, the first phase shifter may be adjusted responsive to the comparison. For example, a correspondence between phases selected in a control signal and phase shifting in the phase shifter may be adjusted. For example, the phase shifter of the first signal path may be adjusted such that a phase shift imparted by the first signal path is the same as a phase shift imparted by the second signal path. Alternatively, the phase shifter and/or the first signal path may be disabled, e.g., responsive to a determination that the phase shifter or the first signal path is not shifting phases correctly.

In some embodiments, block 906 may include cycling the phase shifter through a phase range. Block 908 may include determining a phase of the phase range that results in a greatest difference between the phase of the first output signal to the phase of the second output signal. Block 910 may include adjusting the second phase shifter such that the determined phase corresponds to a 180° phase difference between the first phase shifter and the second phase shifter.

In some embodiments, block 906 may include cycling the phase shifter through a phase range. Block 908 may include combining the first output signal and the second output signal and determining a phase of the phase range at which the first output signal and the second output signal substantially cancel each other. Block 910 may include adjusting the phase shifter such that the determined phase corresponds to a 180° phase difference between the first phase shifter and the second phase shifter.

In some embodiments, block 906 and block 908 may collectively include iteratively adjusting a phase of the phase shifter and comparing the phase of the first output signal to the phase of the second output signal to determine a phase of the phase range that results in a greatest difference between the phase of the first output signal to the phase of the second output signal.

In some embodiments, method 900 may additionally include holding a phase of a second phase shifter of the second signal path constant while modulating the first phase shifter at block 906.

In some embodiments, method 900 may additionally include adjusting one of the first signal path or the second signal path such that an amplitude of the first output signal is substantially the same as an amplitude of the second output signal.

In some embodiments, method 900 may additionally measuring an amplitude of the first output signal, measuring an amplitude of the second output signal, comparing the amplitude of the first output signal to the amplitude of the second output signal, and adjusting one of the first signal path or the second signal path responsive to the comparison between the amplitude of the first output signal to the amplitude of the second output signal. In some embodiments, measuring the amplitude of the first output signal may include measuring the amplitude of the first output signal at a first time when the first signal path is powered on and the second signal path is powered off. In some embodiments, measuring the amplitude of the second output signal may include measuring the amplitude of the second output signal at a second time when the first signal path is powered off and the second signal path is powered on.

Figure 10:
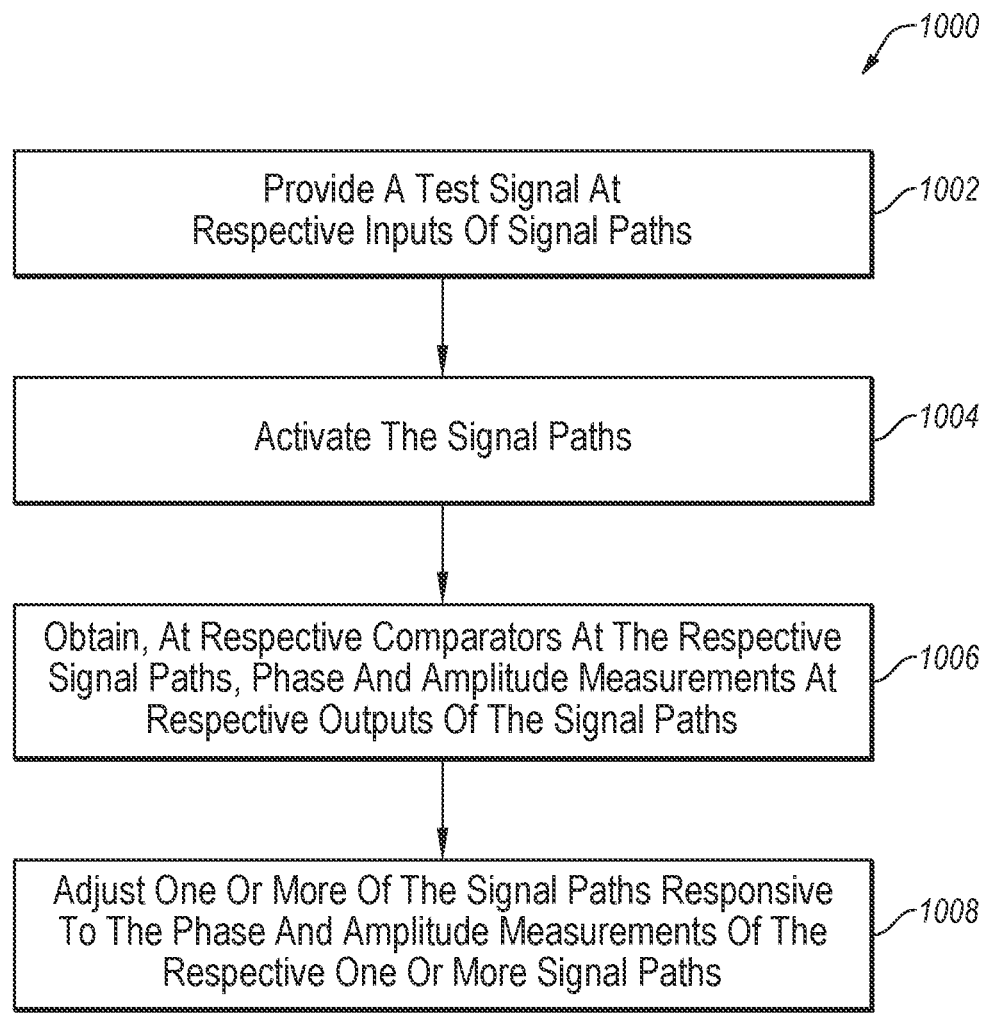
FIG. 10 is a flowchart of yet another example method according to one or more embodiments.

FIG. 10 is a flowchart of yet another example method 1000 according to one or more embodiments. At least a portion of method 1000 may be performed, in some examples, by a device or system, such as device 200 of FIG. 2, device 300 of FIG. 3, device 400 of FIG. 4, device 500 of FIG. 5, system 600 of FIG. 6, device 1100 of FIG. 11, or another device or system. Although illustrated as discrete blocks, various blocks may be divided into additional blocks, combined into fewer blocks, or eliminated, depending on the desired implementation.

At block 1002, a test signal may be provided at respective inputs of signal paths. For example, test signal 632a of FIG. 6 or test signal 634a of FIG. 6 may be provided to a front end of signal path 602a of FIG. 6, test signal 632b of FIG. 6 or test signal 634b of FIG. 6 may be provided to a front end of signal path 602b of FIG. 6, test signal 632c of FIG. 6 or test signal 634c of FIG. 6 may be provided to a front end of signal path 602c of FIG. 6, and/or test signal 632d of FIG. 6 or test signal 634d of FIG. 6 may be provided to a front end of signal path 602d of FIG. 6. In such examples, the front ends of signal path 602a, signal path 602b, signal path 602c, and signal path 602d may be the respective inputs of signal path 602a, signal path 602b, signal path 602c, and signal path 602d.

As an alternative example, test signal 636a of FIG. 6 or test signal 638a of FIG. 6 may be provided at a back end of signal path 602a, test signal 636a of FIG. 6 or test signal 638a of FIG. 6 may be provided at a back end of signal path 602b, test signal 636b of FIG. 6 or test signal 638b of FIG. 6 may be provided at a back end of signal path 602c, and/or test signal 636b of FIG. 6 or test signal 638b of FIG. 6 may be provided at a back end of signal path 602d. In such examples, the back ends of signal path 602a, signal path 602b, signal path 602c, and signal path 602d may be the respective inputs of signal path 602a, signal path 602b, signal path 602c, and signal path 602d.

At block 1004, the signal paths may be activated. At block 1004, the signal paths may be activated one at a time. For example, signal path 602a, signal path 602b, signal path 602c, and signal path 602d may be activated, one at a time. Alternatively, at block 1004, the signal paths may be activated two, or more, at a time. For example, signal path 602a, signal path 602b, signal path 602c, and signal path 602d may be activated, two, or more, at a time.

At block 1006, phase and amplitude measurements may be obtained, at respective comparators at the respective signal paths, at respective outputs of the signal paths. For example, in a case where the back ends of signal path 602a, signal path 602b, signal path 602c, and signal path 602d are the outputs of the signal paths, comparator 608a of FIG. 6, comparator 608c of FIG. 6 comparator 608d, and/or comparator 608f may obtain the phase and amplitude measurements at the back ends. In a case where the front ends of signal path 602a, signal path 602b, signal path 602c, and signal path 602d are the outputs of the signal paths, comparator 608a, comparator 608b, comparator 608d, and/or comparator 608e may obtain the phase and amplitude measurements at the front ends.

At block 1008, one or more of the signal paths may be adjusted responsive to the phase and amplitude measurements of the respective one or more signal paths. For example, a correspondence between phases selected in a control signal and phase shifting in the phase shifter may be adjusted. Alternatively, the phase shifter and/or the signal path may be disabled, e.g., responsive to a determination that the phase shifter or the signal path is not shifting phases correctly.

In some embodiments, the test signal of block 1002, may be provided by respective test-signal providers at respective dies of the respective signal paths.

In some embodiments, block 1002 may include generating the test signal at an oscillator and providing the test signal at a first manifold coupled to the inputs of the signal paths. Block 1006 may include measuring a phase and an amplitude of respective output signals at a second manifold coupled to the respective outputs of the signal paths. Manifold 644 and manifold 646 may be examples of the first and second manifold.

In some embodiments, block 1002 may include broadcasting the test signal from an antenna. Test signal 231 of FIG. 2, is an example of such a test signal.

Modifications, additions, or omissions may be made to method 800 of FIG. 8, method 900 of FIG. 9, and/or method 1000 of FIG. 10 without departing from the scope of the present disclosure. For example, the operations of method 800, method 900, and/or method 1000 may be implemented in differing order. Furthermore, the outlined operations and actions are only provided as examples, and some of the operations and actions may be optional, combined into fewer operations and actions, or expanded into additional operations and actions without detracting from the essence of the disclosed example.

Figure 11:
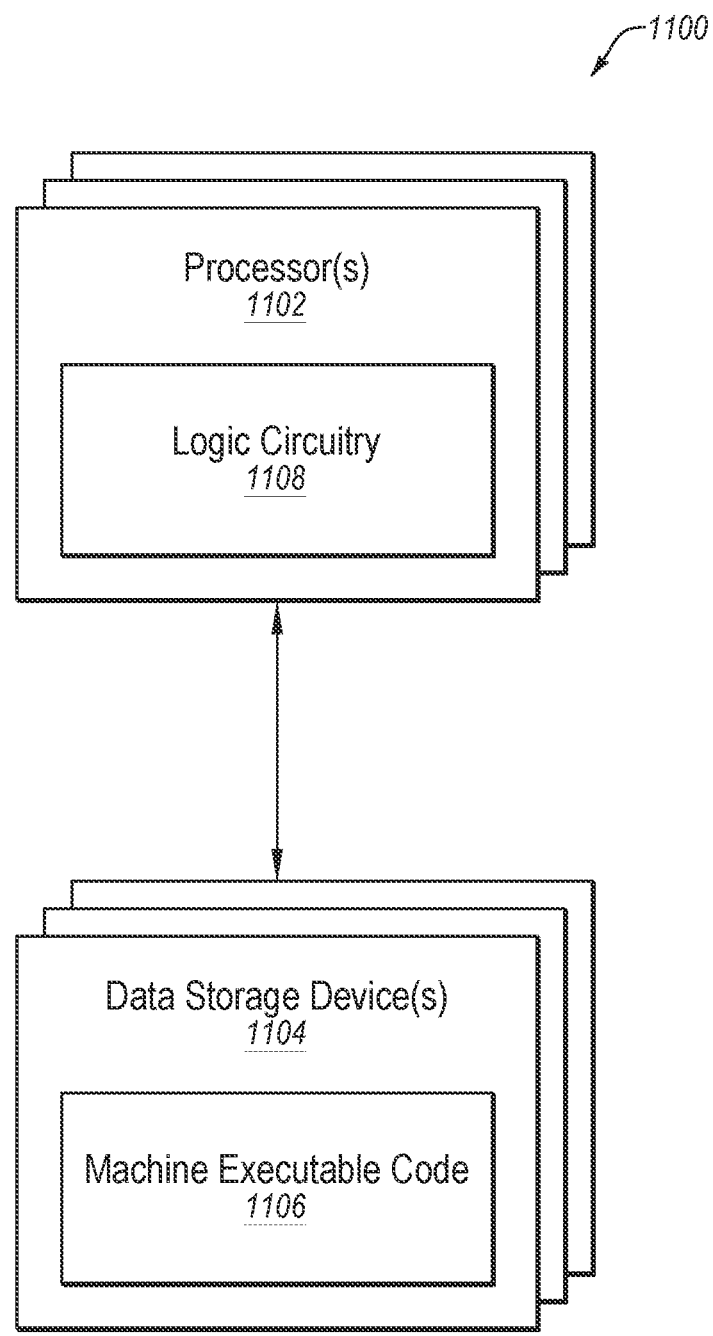
FIG. 11 illustrates a functional block diagram of an example device that may be used to implement various functions, operations, acts, processes, or methods, in accordance with one or more examples.

FIG. 11 illustrates a functional block diagram of a device 1100 that may be used to implement various functions, operations, acts, processes, or methods, in accordance with one or more examples. Device 1100 includes one or more processors 1102 (sometimes referred to herein as "processors 1102") operably coupled to one or more apparatuses such as data storage devices (sometimes referred to herein as "storage 1104"). Storage 1104 includes machine executable code 1106 stored thereon (e.g., stored on a computer-readable memory) and processors 1102 include logic circuitry 1108. Machine executable code 1106 include information describing functional elements that may be implemented by (e.g., performed by) logic circuitry 1108. Logic circuitry 1108 is implements (e.g., performs) the functional elements described by machine executable code 1106. Device 1100, when executing the functional elements described by machine executable code 1106, should be considered as special purpose hardware may carry out the functional elements disclosed herein. In one or more examples, processors 1102 may perform the functional elements described by machine executable code 1106 sequentially, concurrently (e.g., on one or more different hardware platforms), or in one or more parallel process streams.

When implemented by logic circuitry 1108 of processors 1102, machine executable code 1106 may adapt processors 1102 to perform operations of examples disclosed herein. For example, machine executable code 1106 may adapt processors 1102 to perform at least a portion or a totality of method 800 of FIG. 8, method 900 of FIG. 9, and/or method 1000 of FIG. 10. As another example, machine executable code 1106 may adapt processors 1102 to perform at least a portion or a totality of the operations discussed for device 200 of FIG. 2, device 300 of FIG. 3, device 400 of FIG. 4, device 500 of FIG. 5, and/or system 600 of FIG. 6. As another example, machine executable code 1106 may adapt processors 1102 to perform at least a portion or a totality of the operations discussed for comparator 208 of FIG. 2, controller 230 of FIG. 2, comparator 308 of FIG. 3, controller 330 of FIG. 3, comparator 408 of FIG. 4, controller 430 of FIG. 4, comparator 508a of FIG. 5, comparator 508b of FIG. 5, comparator 508c of FIG. 5, controller 530 of FIG. 5, comparator 608a of FIG. 6, comparator 608b of FIG. 6, comparator 608c of FIG. 6, comparator 608d of FIG. 6, comparator 608e of FIG. 6, comparator 608f of FIG. 6, controller 630a of FIG. 6, and/or controller 630b of FIG. 6.

Processors 1102 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes computing instructions (e.g., software code) related to examples. It is noted that a general-purpose processor (may also be referred to herein as a host processor or simply a host) may be a microprocessor, but in the alternative, processors 1102 may include any conventional processor, controller, microcontroller, or state machine. Processors 1102 may also be implemented as a combination of computing devices, such as a combination of a DSP and a microprocessor, a plurality of microprocessors, one or more microprocessors in conjunction with a DSP core, or any other such configuration.

In one or more examples, storage 1104 includes volatile data storage (e.g., random-access memory (RAM)), non-volatile data storage (e.g., Flash memory, a hard disc drive, a solid state drive, erasable programmable read-only memory (EPROM)). In one or more examples processors 1102 and storage 1104 may be implemented into a single device (e.g., a semiconductor device product, a system on chip (SOC)). In one or more examples processors 1102 and storage 1104 may be implemented into separate devices.

In one or more examples, machine executable code 1106 may include computer-readable instructions (e.g., software code, firmware code). By way of non-limiting example, the computer-readable instructions may be stored by storage 1104, accessed directly by processors 1102, and executed by processors 1102 using at least logic circuitry 1108. Also by way of non-limiting example, the computer-readable instructions may be stored on storage 1104, transmitted to a memory device (not shown) for execution, and executed by processors 1102 using at least logic circuitry 1108. Accordingly, in one or more examples logic circuitry 1108 includes electrically configurable logic circuitry.

In one or more examples, machine executable code 1106 may describe hardware (e.g., circuitry) to be implemented in logic circuitry 1108 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used. By way of non-limiting examples, VERILOG™, SystemVerilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers) of logic circuitry 1108 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in one or more examples machine executable code 1106 may include an HDL, an RTL, a GL description, a mask level description, other hardware description, or any combination thereof.

In examples where machine executable code 1106 includes a hardware description (at any level of abstraction), a system (not shown, but including storage 1104) may implement the hardware description described by machine executable code 1106. By way of non-limiting example, processors 1102 may include a programmable logic device (e.g., an FPGA or a PLC) and the logic circuitry 1108 may be electrically controlled to implement circuitry corresponding to the hardware description into logic circuitry 1108. Also by way of non-limiting example, logic circuitry 1108 may include hard-wired logic manufactured by a manufacturing system (not shown, but including storage 1104) according to the hardware description of machine executable code 1106.

Regardless of whether machine executable code 1106 includes computer-readable instructions or a hardware description, logic circuitry 1108 performs the functional elements described by machine executable code 1106 when implementing the functional elements of machine executable code 1106. It is noted that although a hardware description may not directly describe functional elements, a hardware description indirectly describes functional elements that the hardware elements described by the hardware description are capable of performing.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used in the present disclosure, the terms "module" or "component" may refer to specific hardware implementations may perform the actions of the module or component or software objects or software routines that may be stored on or executed by general purpose hardware (e.g., computer-readable media, processing devices) of the computing system. In one or more examples, the different components, modules, engines, and services described in the present disclosure may be implemented as objects or processes that execute on the computing system (e.g., as separate threads). While some of the system and methods described in the present disclosure are generally described as being implemented in software (stored on or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to"). As used herein, "each" means "some or a totality." As used herein, "each and every" means "a totality."

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" or "an" means "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C" or "one or more of A, B, and C." is used, in general such a construction is intended to include A alone, B alone, C alone, A and B together, A and C together, B and C together, or A, B, and C together.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

Additional non-limiting embodiments of the disclosure, include:

Embodiment 1: A device comprising: signal paths comprising respective front ends for coupling to respective antenna elements and respective back ends for coupling to a manifold; and a comparator that is one of: coupled to a respective front end of a first signal path of the signal paths and coupled to a respective back end of the first signal path, to compare a phase of a first signal from the respective front end of the first signal path with a phase of a second signal from the respective back end of the first signal path; coupled to the respective front end of the first signal path and coupled to a respective front end of a second signal path of the signal paths, to compare the phase of the first signal from the respective front end of the first signal path with a phase of a third signal from the respective front end of the second signal path; or coupled to the respective back end of the first signal path and coupled to a respective back end of the second signal path, to compare the phase of the second signal from the respective back end of the first signal path with a phase of a fourth signal from the respective back end of the second signal path.

Embodiment 2: The device according to Embodiment 1, comprising a radio-frequency integrated circuit comprising the signal paths and the comparator.

Embodiment 3: The device according to any of Embodiments 1 and 2, wherein the first signal path comprises a phase shifter, and wherein the device further comprises a controller, the controller to adjust the phase shifter responsive to a comparison of the comparator.

Embodiment 4: The device according to any of Embodiments 1 through 3, wherein the controller is to cause the phase shifter to cycle through a phase range while the comparator performs the comparison.

Embodiment 5: The device according to any of Embodiments 1 through 4, wherein the comparator comprises: a summer; a rectifier coupled to the summer; and an analog-to-digital converter coupled to the rectifier.

Embodiment 6: The device according to any of Embodiments 1 through 5, wherein the comparator further comprises: two multi-way switches between the summer and the rectifier, the two multi-way switches forming at least three alternative paths between the two multi-way switches, the at least three alternatives paths comprising: a first path comprising an amplifier; a second path comprising a line; and a third path comprising an attenuator.

Embodiment 7: The device according to any of Embodiments 1 through 6, further comprising a test-signal provider to provide a test signal, the test-signal provider comprising one or more of: an oscillator to generate the test signal; and an external calibration input terminal to receive the test signal.

Embodiment 8: The device according to any of Embodiments 1 through 7, wherein one of: the first signal path comprises a first phase shifter, the comparator is coupled to the respective front end of the first signal path at a point between the first phase shifter and a first antenna element, and the comparator is coupled to the respective back end of the first signal path at a point between the first phase shifter and the manifold; the first signal path comprises the first phase shifter, the second signal path comprises a second phase shifter, the comparator is coupled to the respective front end of the first signal path at the point between the first phase shifter and the first antenna element, and the comparator is coupled to the respective front end of the second signal path at a point between the second phase shifter and a second antenna element; and the first signal path comprises the first phase shifter, the second signal path comprises the second phase shifter, the comparator is coupled to the respective back end of the first signal path at the point between the first phase shifter and manifold, and the comparator is coupled to the respective back end of the second signal path at a point between the second phase shifter and the manifold.

Embodiment 9: The device according to any of Embodiments 1 through 8, wherein the comparator that is coupled to the respective front end of the first signal path and coupled to the respective back end of the first signal path, to compare the phase of the first signal from the respective front end of the first signal path with the phase of the second signal from the respective back end of the first signal path.

Embodiment 10: The device according to any of Embodiments 1 through 9, wherein the device further comprises a test-signal provider to provide a test signal at the respective front end of the first signal path and wherein the comparator is to compare a phase of the test signal as provided at the respective front end of the first signal path to the phase of the second signal from the respective back end of the first signal path.

Embodiment 11: The device according to any of Embodiments 1 through 10, wherein the device further comprises a test-signal provider to provide a test signal at the respective back end of the first signal path and wherein the comparator is to compare a phase of the test signal as provided at the respective back end of the first signal path to the phase of the first signal from the respective front end of the first signal path.

Embodiment 12: The device according to any of Embodiments 1 through 11, wherein the comparator is coupled to the respective front end of the first signal path and coupled to the respective front end of the second signal path, to compare the phase of the first signal from the respective front end of the first signal path with the phase of the third signal from the respective front end of the second signal path.

Embodiment 13: The device according to any of Embodiments 1 through 12, wherein the device further comprises a test-signal provider to provide a test signal at the respective back end of the first signal path and the respective back end of the second signal path, the test-signal provider comprising one or more of: an oscillator to generate the test signal; and an external calibration input terminal to receive the test signal.

Embodiment 14: The device according to any of Embodiments 1 through 13, wherein the comparator is to compare an amplitude of the first signal with an amplitude of the third signal.

Embodiment 15: The device according to any of Embodiments 1 through 14, wherein the comparator is coupled to the respective back end of the first signal path and coupled to the respective back end of the second signal path, to compare the phase of the second signal from the respective back end of the first signal path with the phase of the fourth signal from the respective back end of the second signal path.

Embodiment 16: The device according to any of Embodiments 1 through 15, wherein the device further comprises a test-signal provider to provide a test signal at the respective front end of the first signal path and the respective front end of the second signal path, the test-signal provider comprising one or more of: an oscillator to generate the test signal; and an external calibration input terminal to receive the test signal.

Embodiment 17: The device according to any of Embodiments 1 through 16, wherein the comparator is to compare an amplitude of the first signal with an amplitude of the fourth signal.

Embodiment 18: A method comprising: providing a test signal to an input of a signal path; modulating a phase shifter of the signal path; comparing a phase of a first signal with a phase of a second signal; and adjusting the phase shifter responsive to the comparison.

Embodiment 19: The method according to Embodiment 18, further comprising adjusting the signal path such that an amplitude of the first signal is substantially the same as an amplitude of the second signal.

Embodiment 20: The method according to any of Embodiments 18 and 19 wherein modulating the phase shifter comprises cycling the phase shifter through a phase range, wherein comparing the phase of the first signal to the phase of the second signal comprises determining a phase of the phase range that results in a greatest difference between the phase of the first signal and the phase of the second signal, and wherein adjusting the phase shifter comprises adjusting the phase shifter such that the determined phase corresponds to a 180° phase shift in the phase shifter.

Embodiment 21: The method according to any of Embodiments 18 through 20, wherein comparing the phase of the first signal with the phase of the second signal comprises comparing the phase of the test signal to the phase of an output signal at an output of the signal path.

Embodiment 22: The method according to any of Embodiments 18 through 21, wherein the signal path comprises a first signal path, wherein the method further comprises providing the test signal to an input of a second signal path, and wherein comparing the phase of the first signal with the phase of the second signal comprises comparing a phase of a first output signal at an output of the first signal path with a phase of a second output signal at an output of the second signal path.

Embodiment 23: A method comprising: providing a test signal at respective inputs of signal paths; activating the signal paths; obtaining, at respective comparators at the respective signal paths, phase and amplitude measurements at respective outputs of the signal paths; and adjusting one or more of the signal paths responsive to the phase and amplitude measurements of the respective signal paths.

Embodiment 24: The method according to Embodiment 23, wherein providing the test signal comprises providing the test signal from respective test-signal providers at the respective dies.

Embodiment 25: The method according to any of Embodiments 23 and 24, wherein providing the test signal comprises generating the test signal at an oscillator and providing the test signal at a first manifold coupled to the inputs of the signal paths, and wherein obtaining the phase and amplitude measurements comprises measuring a phase and an amplitude of respective output signals at a second manifold coupled to the respective outputs of the signal paths.

Embodiment 26: The method according to any of Embodiments 23 through 25, wherein activating the signal paths comprises activating the signal paths one at a time.

Embodiment 27: The method according to any of Embodiments 23 through 26, wherein the signal paths comprise respective front ends for coupling to a respective antenna element and the signal paths comprise respective back ends for coupling to an array receiver.

Embodiment 28: A device comprising: a signal path comprising a front end for coupling to an antenna element and a back end for coupling to a manifold; and a comparator coupled to the front end of the signal path to the back end of the signal path, to compare a phase of a first signal from the front end of the signal path with a phase of a second signal from the back end of the signal path.

Embodiment 29: A device comprising: signal paths comprising respective front ends for coupling to respective antenna elements and respective back ends for coupling to a manifold; and a comparator coupled to a respective front end of a first signal path of the signal paths and coupled to a respective front end of a second signal path of the signal paths, to compare a phase of a first signal from the respective front end of the first signal path with a phase of a second signal from the respective front end of the second signal path.

Embodiment 30: A device comprising: signal paths comprising respective front ends for coupling to respective antenna elements and respective back ends for coupling to a manifold; and a comparator coupled to a respective back end of a first signal path of the signal paths and coupled to a respective back end of a second signal path of the signal paths, to compare a phase of a first signal from the respective back end of the first signal path with a phase of a second signal from the respective back end of the second signal path.

What is claimed is:

1. A device comprising:
   signal paths comprising respective front ends for coupling to respective antenna elements and respective back ends for coupling to a manifold; and
   a comparator that is one of:
   coupled to a respective front end of a first signal path of the signal paths and coupled to a respective back end of the first signal path, to compare a phase of a first signal from the respective front end of the first signal path with a phase of a second signal from the respective back end of the first signal path;
   coupled to the respective front end of the first signal path and coupled to a respective front end of a second signal path of the signal paths, to compare the phase of the first signal from the respective front end of the first signal path with a phase of a third signal from the respective front end of the second signal path; or
   coupled to the respective back end of the first signal path and coupled to a respective back end of the second signal path, to compare the phase of the second signal from the respective back end of the first signal path with a phase of a fourth signal from the respective back end of the second signal path.

2. The device of claim 1, comprising a radio-frequency integrated circuit comprising the signal paths and the comparator.

3. The device of claim 1, wherein the first signal path comprises a phase shifter, and wherein the device further comprises a controller, the controller to adjust the phase shifter responsive to a comparison of the comparator.

4. The device of claim 3, wherein the controller is to cause the phase shifter to cycle through a phase range while the comparator performs the comparison.

5. The device of claim 1, wherein the comparator comprises:
   a summer;
   a rectifier coupled to the summer; and
   an analog-to-digital converter coupled to the rectifier.

6. The device of claim 5, wherein the comparator further comprises:
   two multi-way switches between the summer and the rectifier, the two multi-way switches forming at least three alternative paths between the two multi-way switches, the at least three alternatives paths comprising:
   a first path comprising an amplifier;
   a second path comprising a line; and
   a third path comprising an attenuator.

7. The device of claim 1, further comprising a test-signal provider to provide a test signal, the test-signal provider comprising one or more of:
   an oscillator to generate the test signal; and
   an external calibration input terminal to receive the test signal.

8. The device of claim 1, wherein one of:
   the first signal path comprises a first phase shifter, the comparator is coupled to the respective front end of the first signal path at a point between the first phase shifter and a first antenna element, and the comparator is coupled to the respective back end of the first signal path at a point between the first phase shifter and the manifold;
   the first signal path comprises the first phase shifter, the second signal path comprises a second phase shifter, the comparator is coupled to the respective front end of the first signal path at the point between the first phase shifter and the first antenna element, and the comparator is coupled to the respective front end of the second signal path at a point between the second phase shifter and a second antenna element; and
   the first signal path comprises the first phase shifter, the second signal path comprises the second phase shifter, the comparator is coupled to the respective back end of the first signal path at the point between the first phase shifter and manifold, and the comparator is coupled to the respective back end of the second signal path at a point between the second phase shifter and the manifold.

9. The device of claim 1, wherein the comparator that is coupled to the respective front end of the first signal path and coupled to the respective back end of the first signal path, to compare the phase of the first signal from the respective front end of the first signal path with the phase of the second signal from the respective back end of the first signal path.

10. The device of claim 9, wherein the device further comprises a test-signal provider to provide a test signal at the respective front end of the first signal path and wherein the comparator is to compare a phase of the test signal as provided at the respective front end of the first signal path to the phase of the second signal from the respective back end of the first signal path.

11. The device of claim 9, wherein the device further comprises a test-signal provider to provide a test signal at the respective back end of the first signal path and wherein the comparator is to compare a phase of the test signal as provided at the respective back end of the first signal path to the phase of the first signal from the respective front end of the first signal path.

12. The device of claim 1, wherein the comparator is coupled to the respective front end of the first signal path and coupled to the respective front end of the second signal path, to compare the phase of the first signal from the respective front end of the first signal path with the phase of the third signal from the respective front end of the second signal path.

13. The device of claim 12, wherein the device further comprises a test-signal provider to provide a test signal at the respective back end of the first signal path and the respective back end of the second signal path, the test-signal provider comprising one or more of:
   an oscillator to generate the test signal; and
   an external calibration input terminal to receive the test signal.

14. The device of claim 12, wherein the comparator is to compare an amplitude of the first signal with an amplitude of the third signal.

15. The device of claim 1, wherein the comparator is coupled to the respective back end of the first signal path and coupled to the respective back end of the second signal path, to compare the phase of the second signal from the respective back end of the first signal path with the phase of the fourth signal from the respective back end of the second signal path.

16. The device of claim 15, wherein the device further comprises a test-signal provider to provide a test signal at the respective front end of the first signal path and the respective front end of the second signal path, the test-signal provider comprising one or more of:
   an oscillator to generate the test signal; and
   an external calibration input terminal to receive the test signal.

17. The device of claim 15, wherein the comparator is to compare an amplitude of the first signal with an amplitude of the fourth signal.

\* \* \* \* \*